United States Patent [19]

Sumiyoshi et al.

[11] Patent Number: 5,434,671
[45] Date of Patent: Jul. 18, 1995

[54] BIREFRINGENT MEMBER CELL GAP MEASUREMENT METHOD AND INSTRUMENT

[75] Inventors: Ken Sumiyoshi; Yoriko Hatada, both of Tokyo, Japan

[73] Assignee: NEC Corporation, Japan

[21] Appl. No.: 170,152

[22] Filed: Dec. 20, 1993

[30] Foreign Application Priority Data

Dec. 25, 1992 [JP] Japan .................................. 4-347062
Jan. 14, 1993 [JP] Japan .................................. 5-005252

[51] Int. Cl.6 ........................ G01B 11/14; G02F 1/13
[52] U.S. Cl. ...................................... 356/367; 356/382
[58] Field of Search ............... 356/382, 364, 365, 366, 356/367, 368, 33, 34, 35

[56] References Cited

U.S. PATENT DOCUMENTS

| | | | |
|---|---|---|---|
| 4,368,645 | 1/1983 | Glenn et al. | 356/33 |
| 4,973,163 | 11/1990 | Sakai et al. | 356/35 |
| 5,239,365 | 8/1993 | Inoue | 356/367 |

OTHER PUBLICATIONS

Dill et al. "Ellipsometry with Pulsed Tunable Laser Sources" *IBM Technical Disclosure Bulletin* vol. 19, No. 4 (Sep. 1976) pp. 1487–1489.
Lien et al. "Cell Gap Measurement of Filled Twisted Nematic Liquid Crystal by a Phase Compensation Method" *J. Appl. Phys.* 69(3) 1 Feb. 1991 pp. 1304–1309.

*Primary Examiner*—Richard A. Rosenberger
*Attorney, Agent, or Firm*—Laff, Whitesel, Conte & Saret

[57] ABSTRACT

A first polarizer and a second polarizer are located in an opposing relationship to each other on the optical axis of incident light with their polarization directions displaced from each other by a predetermined angle. A liquid crystal cell is arranged between the first polarizer and the second polarizer for rotation around the optical axis of the incident light. The incident light is introduced into the first polarizer while the liquid crystal cell is rotated. Transmission light, which is the incident light that has been transmitted successively through the first polarizer, the liquid crystal cell, and the second polarizer, is received by a photo-detector. The ratio between a variable component and a fixed component of the intensity of the transmission light is calculated. The cell gap of the liquid crystal cell is determined from the calculated ratio.

14 Claims, 20 Drawing Sheets

BIREFRINGENT MEMBER CELL GAP MEASUREMENT METHOD AND INSTRUMENT

BACKGROUND OF THE INVENTION

The present invention relates to a birefringent member cell gap measurement method and instrument for measuring the cell gap of a birefringent member such as a liquid crystal cell.

A liquid crystal cell of twisted nematic structure, which is a type of birefringent member, is employed widely for liquid crystal display units and like apparatus because with such a cell, a high contrast can be readily obtained. Optical properties of the liquid crystal cell of twisted nematic structure depend upon the cell gap (normally less than 10 $\mu$m) which is the thickness of a liquid crystal layer constituting the liquid crystal cell and the refractive index anisotropy of a liquid crystal substance constituting the liquid crystal cell. Accordingly, in order to use the liquid crystal cell of twisted nematic structure, it is important to measure the cell gap and the refractive index anisotropy. However, since the refractive index anisotropy depends upon the liquid crystal substance used, it is not easy to vary the refractive index anisotropy. Consequently, it is important to measure the cell gap. Further, since the display uniformity of a liquid crystal display element manufactured using a liquid crystal cell of twisted nematic structure depends upon the uniformity of the cell gap of the liquid crystal cell, in order to obtain a uniform display screen, it is progressively important to measure the uniformity of the cell gap of the liquid crystal cell.

Conventionally, the interferometric method is employed widely as a method of measuring the cell gap of the liquid crystal cell. According to the interferometric method, white light is introduced into a liquid crystal before it is injected with a liquid crystal substance to measure the wavelength dependency (that is, the interference waveform) of the intensity of transmission light or reflection light from the liquid crystal cell. Since the waveform dependency measured at this time has a maximum value and a minimum value depending upon the magnitude of the cell gap of the liquid crystal cell, the cell gap of the liquid crystal cell can be determined from the waveform dependency. In recent years, however, since the method wherein the liquid crystal cell of twisted nematic structure is driven by thin film transistors has become widely used, it has become progressively difficult to accurately determine the cell gap of the liquid crystal cell based on the interferometric method. In particular, since production of thin film transistors for driving the liquid crystal cell on a substrate requires a large number of film formation steps, the liquid crystal cell is formed on the substrate including multi-layered films having different refractive indices from each other. In this instance, since the interference waveform measured includes interference by the multi-layered films in addition to the interference by the cell gap of the liquid crystal cell, it is difficult to accurately determine the cell gap of the liquid crystal cell.

As another method of measuring the cell gap of the liquid crystal cell, there is a method wherein a liquid crystal substance is injected into a liquid crystal cell, following which the cell gap of the liquid crystal cell is measured using a compensator (A. Lien et al., "Cell Gap Measurement of Filled Twisted Nematic Liquid Crystal Display by a Phase Compensation Method," J. Appl. Phys. 69(3), pp. 1304–1309, 1991). In one example of such a case, a Babinet-Soleil compensator is used as the compensator, the liquid crystal cell and the Babinet-Soleil compensator are interposed between a pair of polarization plates, and the amount of transmission light transmitted through the liquid crystal cell and the Babinet-Soleil compensator is measured while the position of a wedge constituting the Babinet-Soleil compensator is mechanically adjusted using a micrometer. The cell gap of the liquid crystal cell is then calculated from the value of a graduation of the micrometer corresponding to the measured amount of transmission light. The cell gap measurement method for a liquid crystal cell which employs a compensator of the type described above may not be influenced by multi-layer films as is the interferometric method described above, but since it requires mechanical adjustment of the Babinet-Soleil compensator and actual reading of the graduation of the micrometer, automation of the measurement method requires a very complicated mechanism, and accordingly, the method is not suitable for automation. Further, since the cell gap measurement method is not suitable for automation, it is also not suitable for measurement of the uniformity of the cell gap of a liquid crystal cell for a liquid crystal display element of twisted nematic structure having a wide area.

SUMMARY OF THE INVENTION

An object of the present invention is to provide a cell gap measurement method and instrument for a birefringent member which can measure the cell gap of the birefringent member automatically and accurately.

Other objects of the present invention will become obvious from the following description.

In accordance with an aspect of the present invention, there is provided a cell gap measurement method for a birefringent member wherein incident light is emitted and passes through first and second polarization transmission means located in an opposing relationship to each other on the optic axis of the incident light with the polarization directions of the first and second polarization transmission means displaced from each other by a predetermined angle and wherein the birefringent member is arranged for rotation around the optic axis of the incident light between the first polarization transmission means and the second polarization transmission means; the measurement method comprises the steps of: introducing the incident light into the first polarization transmission means while rotating the birefringent member; calculating a ratio between a variable component and a fixed component of an intensity of transmission light which is the incident light that has been transmitted successively through the first polarization transmission means, the birefringent member, and the second polarization transmission means; and measuring the cell gap of the birefringent member from the calculated ratio between the variable component and the fixed component of the intensity of the transmission light.

In accordance with another aspect of the present invention, there is provided a cell gap measurement instrument for a birefringent member which comprises a light source for emitting incident light; polarization transmission means into which the incident light emitted from the light source is introduced; polarization separation means for separating the incident light that has passed through the polarization transmission means into first transmission light and second transmission light with a predetermined polarization angle; first photo-detection means for detecting the intensity of the first transmission light emitted from the polarization separation means; second photo-detection means for detecting the intensity of the second transmission light emitted from the polarization separation means; and cell gap calculation means for calculating the cell gap of the birefringent member from the intensity ratio which is the ratio between the intensity of the first transmission light detected by the first photo-detection means and the intensity of the second transmission light detected by the second photo-detection means.

BRIEF DESCRIPTION OF THE DRAWINGS

The features and advantages of the present invention will become apparent from the following description when taken in conjunction with accompanying drawings in which.

DESCRIPTION OF THE PREFERRED EMBODIMENTS

Figure 1:
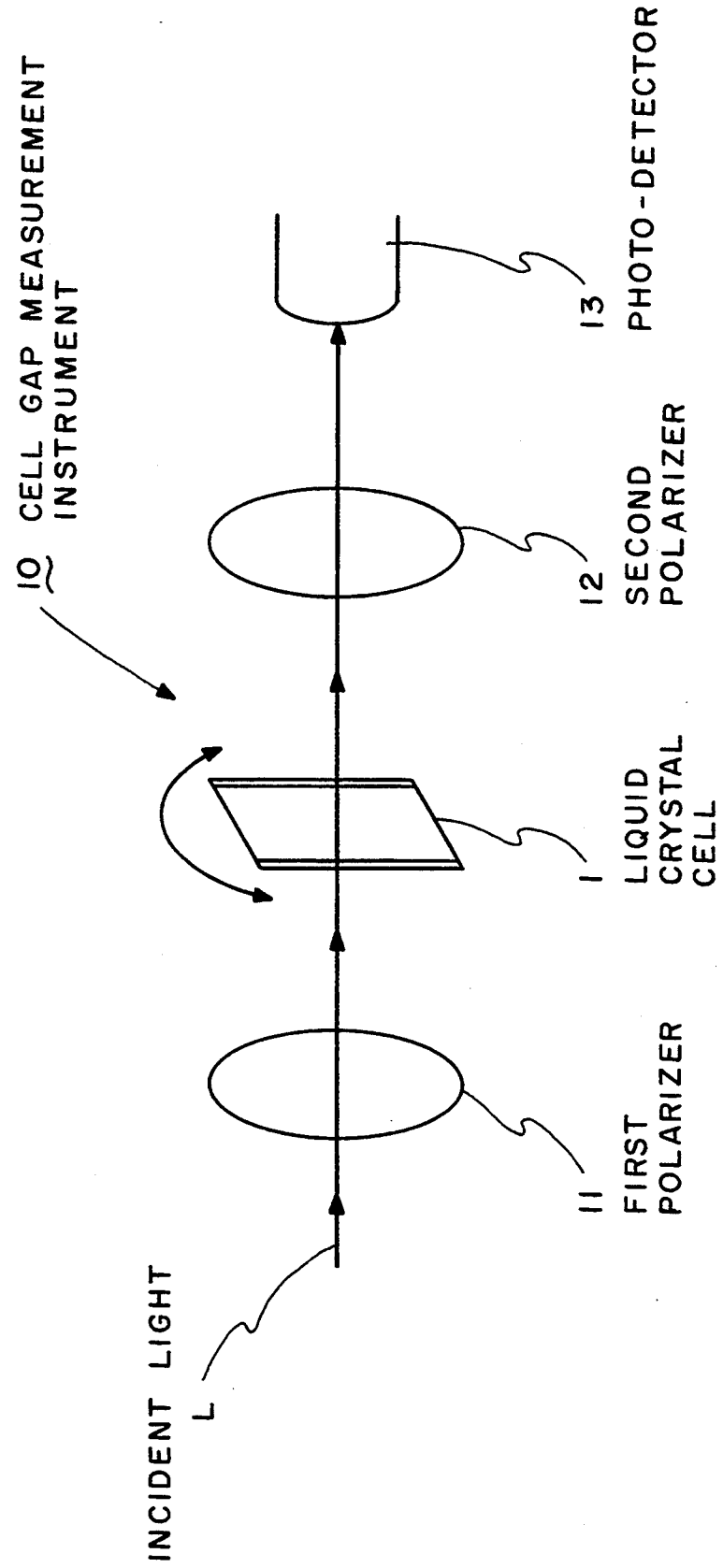
FIG. 1 is a schematic constructive view of a cell gap measurement instrument illustrating the principle of measuring a cell gap of a liquid crystal cell according to a first embodiment of a cell gap measurement method for a birefringent member of the present invention.

The principle of measuring a cell gap of a liquid crystal cell according to the first embodiment of a cell gap measurement method of the present invention is described with reference to a cell gap measurement instrument 10 shown in FIG. 1. The cell gap measurement instrument 10 includes a first polarizer 11 and a second polarizer 12 which are located in an opposing relationship to each other on an optic axis of incident light L, and a photo-detector 13 located on the optic axis of the incident light L on the opposite side of the second polarizer 12 from the first polarizer 11. A liquid crystal cell 1 of twisted nematic structure which is an object for measurement is disposed for rotation around the optic axis of the incident light L between the first polarizer 11 and the second polarizer 12. It is to be noted that the polarization direction of the second polarizer 12 is displaced by a predetermined angle from the polarization direction of the first polarizer 11. In the following description, it is assumed for simplified description that the polarization direction of the second polarizer 12 is displaced by 90° from that of the first polarizer 11. However, similar measurement is also possible where the polarization direction of the second polarizer 12 is displaced by an angle other than 90° with respect to that of the first polarizer 11.

If: the electric field component of the incident light L in the X-axis direction, which is perpendicular to the incidence direction of the incident light L, is represented by $E_X$; the electric field component of the incident light L in the Y-axis direction is represented by $E_Y$; the electric field component of transmission light, which is the incident light L transmitted in the X-axis direction successively through the first polarizer 11, the liquid crystal cell 1 and the second polarizer 12, is represented by $E_X'$; the electric field component of the transmission light in the Y-axis direction is represented by $E_Y'$; the refractive index anisotropy of the liquid crystal cell 1 is represented by $\Delta n$; the twist angle of the liquid crystal cell 1 is represented by $\theta_{TW}$ (in the case of the liquid crystal cell 1 of twisted nematic structure, the twist angle $\theta_{TW}=90°$); the cell gap of the liquid crystal cell 1 is represented by d; the wavelength of the incident light L is represented by $\lambda$; and the rotational angle of the liquid crystal cell 1 (that is, the angle between the orientation direction of the liquid crystal cell 1 and the polarization direction of the first polarizer 11) is represented by $\theta$; then the electric field component $E_X'$ of the transmission light in the X-axis direction and the electric field component $E_Y'$ of the transmission light in the Y-axis direction are represented by the following equation by calculation using the Jones matrix representation:

$$\begin{bmatrix} E_X' \\ E_Y' \end{bmatrix} = \begin{bmatrix} 0 & 0 \\ 0 & 1 \end{bmatrix} \cdot \begin{bmatrix} \cos\theta & \sin\theta \\ -\sin\theta & \cos\theta \end{bmatrix} \cdot \begin{bmatrix} a & b \\ -b^* & a^* \end{bmatrix} \cdot \begin{bmatrix} \cos\theta & -\sin\theta \\ \sin\theta & \cos\theta \end{bmatrix} \cdot \begin{bmatrix} 1 & 0 \\ 0 & 0 \end{bmatrix} \begin{bmatrix} E_X \\ E_Y \end{bmatrix} \quad (1)$$

Meanwhile, the intensity I of the transmission light detected by the photo-detector 13 is represented by the following equation:

$$I = |E_X'|^2 + |E_Y'|^2 \quad (2)$$

where the variations a and b in equation (1) above are complex numbers and represented by the following equations (3) and (4), respectively:

$$a = \frac{1}{\sqrt{1+u^2}} \sin\theta_{TW}\sin(\sqrt{1+u^2}\,\theta_{TW}) + \cos\theta_{TW}\cos(\sqrt{1+u^2}\,\theta_{TW}) + i\frac{1}{\sqrt{1+u^2}}\cos\theta_{TW}\sin(\sqrt{1+u^2}\,\theta_{TW}) \quad (3)$$

$$b = \frac{1}{\sqrt{1+u^2}} \cos\theta_{TW}\sin(\sqrt{1+u^2}\,\theta_{TW}) - \sin\theta_{TW}\cos(\sqrt{1+u^2}\,\theta_{TW}) + i\frac{1}{\sqrt{1+u^2}} \sin\theta_{TW}\sin(\sqrt{1+u^2}\,\theta_{TW})$$

where $$u = \frac{\pi d}{\lambda\,\theta_{TW}} \Delta n \quad (5)$$

It is to be noted that the variations a* and b* in equation (1) above denote complex conjugate numbers with the variations a and b, respectively.

From equations (1) to (5), when the liquid crystal cell 1 of twisted nematic structure is rotated once around the optic axis of the incident light L (that is, when the angle $\theta$ is varied from 0° to 360°), the intensity I of the transmission light has a variable component $I_{AC}$ and a fixed component $I_{DC}$ as represented by the following equation:

$$I = I_{AC} \cdot \cos(4\theta) + I_{DC} \quad (6)$$

where $$I_{AC} = \frac{u^2}{4(u^2+1)}\{1 - \cos(\pi\sqrt{1+u^2})\} \quad (7)$$

$$I_{DC} = \frac{u^2}{4(u^2+1)}\cos(\pi\sqrt{1+u^2}) + \frac{\cos(\pi\sqrt{1+u^2})}{2(u^2+1)} + \frac{3u^2}{4(u^2+1)} + \frac{1}{2(u^2+1)} \quad (8)$$

Figure 2:
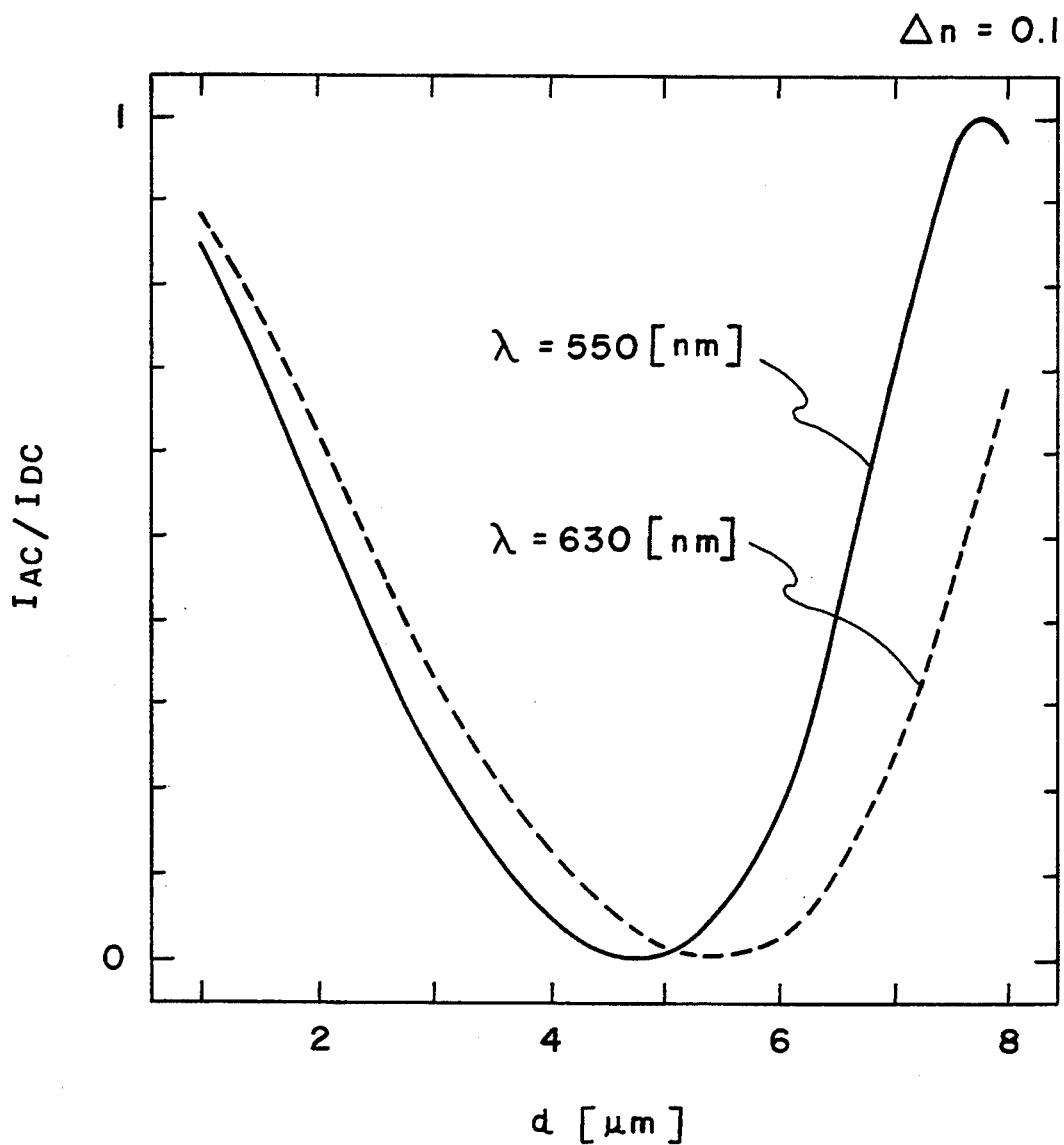
FIG. 2 is a graph showing an example of the result of calculation of the dependency on a cell gap of a liquid crystal cell of the ratio between a variable component and a fixed component of an intensity of transmission light conducted when incident light of a short wavelength is used with the cell gap measurement instrument shown in FIG. 1.
Figure 3:
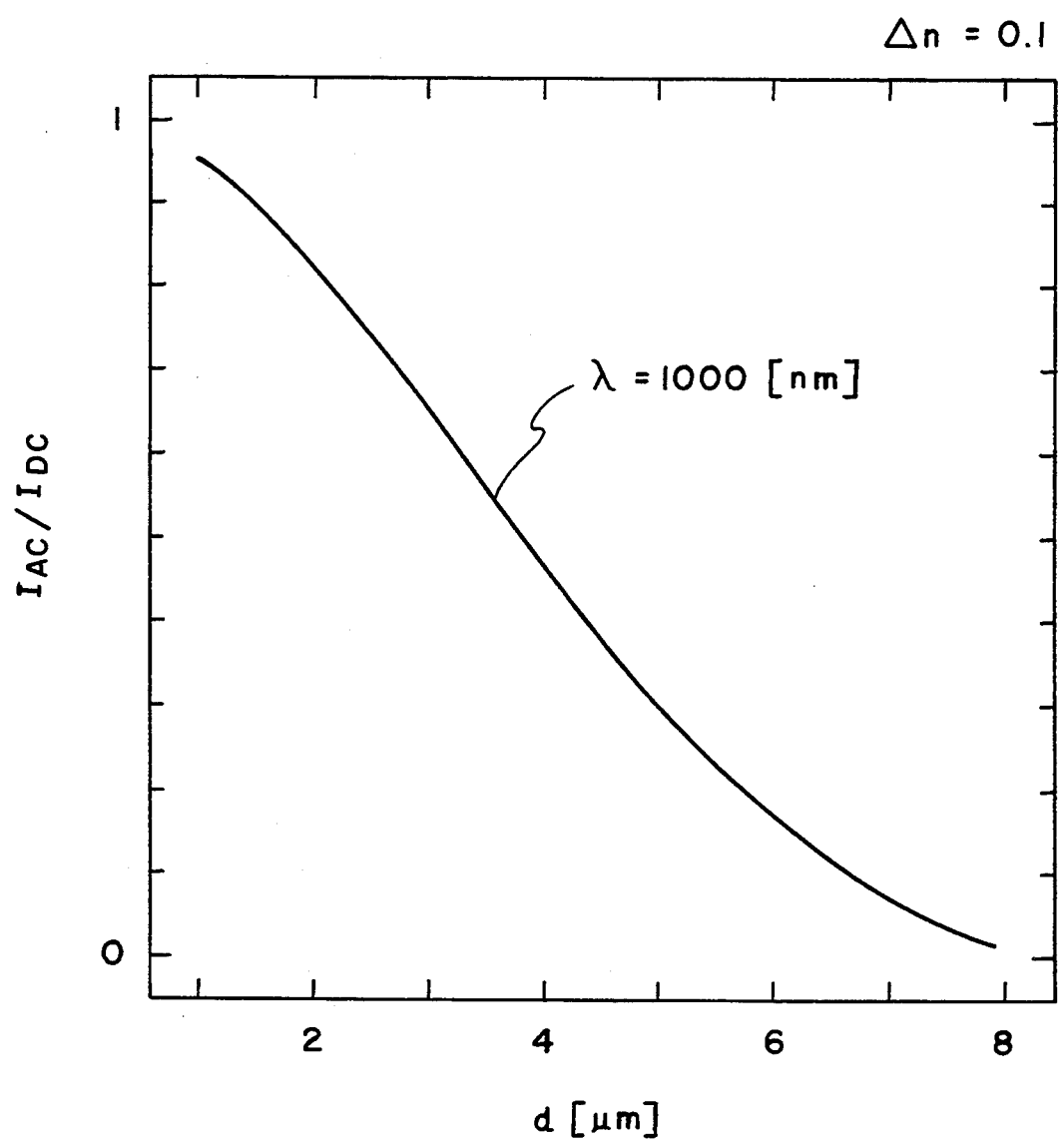
FIG. 3 is a graph showing an example of the result of calculation of the dependency on a cell gap of a liquid crystal cell of the ratio between a variable component and a fixed component of an intensity of transmission light conducted when incident light of a long wavelength is used with the cell gap measurement instrument shown in FIG. 1.

An example of the results of calculation conducted to find the dependency of the ratio $I_{AC}/I_{DC}$ between the variable component $I_{AC}$ and the fixed component $I_{DC}$ of the intensity I of the transmission light upon the cell gap d of the liquid crystal cell 1 from equations (7) and (8) is illustrated in FIGS. 2 and 3. The solid line in FIG. 2 illustrates the result of calculation when the refractive index anisotropy $\Delta n$ of the liquid cell 1 is $\Delta n=0.1$ and the wavelength $\lambda$ of the incident light L is $\lambda=550$ nm, while the broken line in FIG. 2 illustrates the result of calculation when the refractive index anisotropy $\Delta n$ of the liquid crystal cell 1 is $\Delta n=0.1$ and the wavelength $\lambda$ of the incident light L is $\lambda=630$ nm. Meanwhile, FIG. 3 illustrates the result of calculation when the refractive index anisotropy $\Delta n$ of the liquid crystal cell 1 is $\Delta n=0.1$ and the wavelength $\lambda$ of the incident light: L is $\lambda=1,000$ nm. Accordingly, the cell gap d of the liquid crystal cell 1 can be determined from the results of calculation illustrated in FIGS. 2 and 3 by measuring the ratio $I_{AC}/I_{DC}$.

It is to be noted that, when the wavelength $\lambda$ of the incident light L is 550 nm, the cell gap d of the liquid crystal cell 1 has two values corresponding to the measured ratio $I_{AC}/I_{DC}$ as seen from the results of calculation of FIG. 2. However, since the dependency of the ratio $I_{AC}/I_{DC}$ upon the cell gap d of the liquid crystal cell 1 varies in accordance with the wavelength $\lambda$ of the incident light L, by varying the wavelength $\lambda$ of the incident light L and measuring the radio $I_{AC}/I_{DC}$, the cell gap d of the liquid crystal cell 1 can be determined from the two ratios obtained by the measurements. Meanwhile, when the upper limit of the cell gap d of the liquid crystal cell 1 is known in advance, by measuring the ratio $I_{AC}/I_{DC}$ using the incident light L having the wavelength λ of 1,000 nm, the cell gap d of the liquid crystal cell 1 can be determined by a single measurement operation as seen from FIG. 3.

The variable component $I_{AC}$ and the fixed component $I_{DC}$ of the intensity I of the transmission light can be determined readily by measuring the maximum value and the minimum values, respectively, of the intensity I of the transmission light when the liquid crystal cell 1 which is an object for measurement is rotated around the optic axis of the incident light L. In particular, when the first and second polarizers 11 and 12 having polarization directions perpendicular to each other are employed, the intensity I of the transmission light exhibits its maximum value when the polarization directions of the first and second polarizers 11 and 12 form an angle of 45° with respect to the rubbing direction of the liquid crystal cell 1. On the other hand, when the polarization directions of the first and second polarizers 11 and 12 form an angle of 0° or 90° with respect to the rubbing direction of the liquid crystal cell 1, the intensity I of the transmission light exhibits its minimum value. In this instance, the maximum value of the intensity I of the transmission light corresponds to the sum $I_{AC}+I_{DC}$ of the variable component $I_{AC}$ and the fixed component $I_{DC}$, while the minimum value of the intensity I of the transmission light corresponds to the difference $I_{DC}-I_{AC}$ between the fixed component $I_{DC}$ and the variable component $I_{AC}$. Accordingly, by measuring a maximum value and a minimum value of the intensity I of the transmission light, the variable component $I_{AC}$ and the fixed component $I_{DC}$ of the intensity I of the transmission light can be determined.

Figure 4:
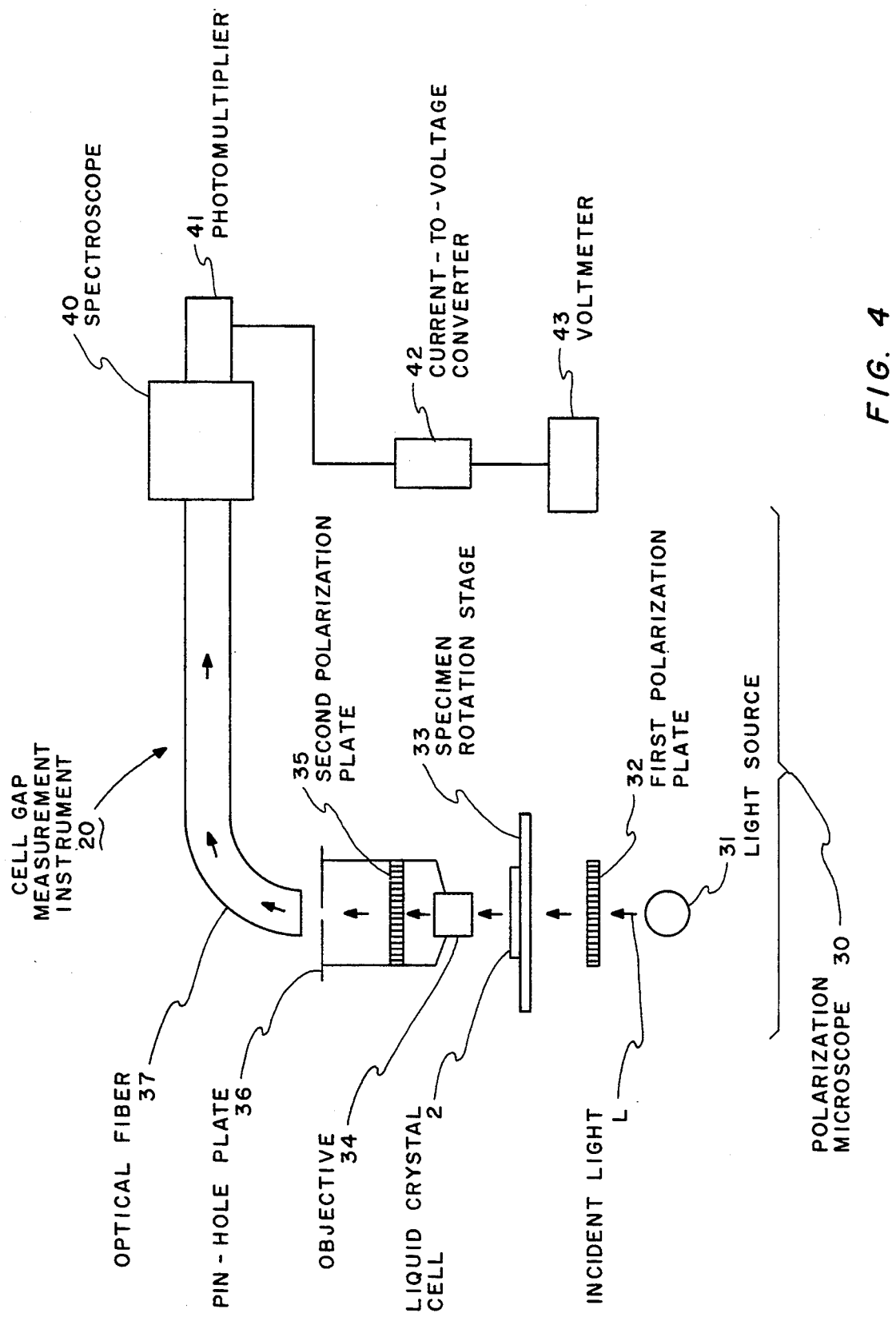
FIG. 4 is a schematic constructive view of a cell gap measurement instrument with which the first embodiment of a cell gap measurement method for a birefringent member of the present invention can be realized.

A cell gap measurement instrument with which the first embodiment of a cell gap measurement method of the present invention described above can be realized is next described with reference to FIG. 4. A cell gap measurement instrument 20 includes a polarization microscope 30, a spectroscope 40, a photomultiplier 41, a current-to-voltage converter 42, and a voltmeter 43. Here, the polarization microscope 30 includes a light source 31 in the form of a halogen lamp for emitting incident light L, a first polarization plate 32 into which the incident light L emitted from the light source 31 is introduced, a specimen rotation stage 33 into which the incident light L transmitted through the first polarization plate 32 is introduced, an objective 34 into which the incident light L transmitted through the specimen rotation stage 33 is introduced, a second polarization plate 35 into which the incident light L transmitted through the objective 34 is introduced, a pin-hole plate 36 having a pin-hole into which the incident light L transmitted through the second polarization plate 35 is introduced, and an optical fiber 37 for introducing the incident light L emitted from the pin-hole of the pin-hole plate 36 into the spectroscope 40. The spectroscope 40 spectrally separates the incident light L introduced thereto by way of the optical fiber 37 to extract only light of a particular wavelength. The photomultiplier 41 converts light extracted by the spectroscope 40 into a current signal. The current-to-voltage converter 42 converts the current signal outputted from the photomultiplier 41 into a voltage signal. The voltmeter 43 reads the voltage value of the voltage signal outputted from the current-to-voltage converter 42. A liquid crystal cell 2 of twisted nematic structure, which is an object for measurement, is placed on the specimen rotation stage 33.

It is to be noted that a liquid crystal cell manufactured in the following manner was employed for the liquid crystal cell 2. A pair of glass substrates each having on a surface thereof transparent electrodes made of an ITO ($In_2O_3+SnO_2$) thin film (oxide indium and oxide tin thin film) were prepared, and an orientation film was applied to each of the glass substrates, whereafter a rubbing process was applied to each glass substrate. The two glass substrates were then adhered to each other with spacers of a diameter of 5 μm interposed between them in such a manner that the rubbing directions might be perpendicular to each other, and liquid crystal was then injected between the glass substrates.

In the cell gap measurement instrument 20 having the construction described above, the incident light L emitted from the light source 31 successively passes through the first polarization plate 32, the specimen rotation stage 33, the liquid crystal cell 2, the objective 34, the second polarization plate 35 and the pin-hole of the pin-hole plate 36 and is then introduced into the spectroscope 40 through the optical fiber 37. From the incident light L introduced into the spectroscope 40, only a predetermined wavelength component is extracted by the spectroscope 40. The light emitted from the spectroscope 40 is introduced into the photo-multiplier 41, by which it is converted into a current signal. The current signal after the conversion is inputted to and converted into a voltage signal by the current-to-voltage converter 42. The voltage signal after the conversion is inputted to the voltmeter 43, from which the voltage value is read.

Next, a method of measuring the cell gap d of the liquid crystal cell 2 using the cell gap measurement instrument 20 is described. Before the liquid crystal cell 2 is placed onto the specimen rotation stage 33, the wavelength of light to be extracted by the spectroscope 40 is set to 550 nm, and either one of the first and second polarization plates 32 and 35 is rotationally adjusted so that the voltage value read on the voltmeter 43 reaches a minimum value, thereby adjusting the polarization direction of the first polarization plate 32 and the polarization direction of the second polarization plate 35 to perpendicular directions relative to each other. Thereafter, the liquid crystal cell 2 is placed onto the specimen rotation stage 33 and the voltage value on the voltmeter 43 is read while rotating the specimen rotation stage 33 to measure a maximum value $V_{MAX}$ of the voltage value read on the voltmeter 43. Then, as the specimen rotation stage 33 is rotated, the voltage value is read from the voltmeter 43 to find a minimum value $V_{MIN}$ of the voltage value read on the voltmeter 43. The intensity I of the transmission light can be found from the maximum value $V_{MAX}$ and the minimum value $V_{MIN}$ of the measured voltage value together with the rotational angle θ (that is, the angle formed between the orientation direction of the liquid crystal cell 2 and the polarization direction of the first polarization plate 32) of the specimen rotation stage 33, according to the following equation:

$$I=\{(V_{MAX}-V_{MIN})\cdot\cos(4\theta)+(V_{MAX}+V_{MIN})\}/2 \qquad (9)$$

Therefore, the variable component $I_{AC}$ of the intensity I of the transmission light can be determined by calculating $(V_{MAX}-V_{MIN})/2$ from equation (6) described above, while the fixed component $I_{DC}$ of the intensity I of the transmission light can be determined by calculating $(V_{MAX}+V_{MIN})/2$. As a result the ratio $I_{AC}/I_{DC}$ can be determined, and consequently, the cell gap d of the liquid crystal cell 2 can be determined.

An example of results of measurement wherein the cell gap d is measured using the cell gap measurement instrument 20 for five liquid crystal cells produced in the manner described above is illustrated in Table 1. It is to be noted that, for comparison, Table 1 shows estimation values of the cell gap estimated based on measurement values of the cell gap d of the liquid crystal cell 2 according to the conventional interferometer method and according to the known dielectric constant, cell area and electric capacitance of the liquid crystal cell 2.

TABLE 1

| | Results of Measurement | | |
|---|---|---|---|
| Cell No. | Measurement Value with Present Equipment | Measurement Value Based on Interferometric Method | Estimated Value |
| TN2 | 4.8 μm | 5.2 μm | 4.8 μm |
| TN3 | 4.8 | 5.0 | 4.8 |
| TN6 | 4.8 | 5.1 | 4.7 |
| TN8 | 4.8 | 5.0 | 4.7 |
| TN9 | 4.7 | 5.1 | 4.6 |

From the results of measurement, it can be seen that the measurement values of the cell gap d of the liquid crystal cell 2 measured using the cell gap measurement instrument 20 coincide well with the estimated values of the cell gap estimated from the known dielectric constant, cell area and electric capacitance of the liquid crystal cell 2. In contrast, it can be seen that the measurement values based on the conventional interferometric method exhibit values that are approximately 10% higher than the estimated values. This is due to an error that occurs because the liquid crystal cell 2 has a multi-layer structure including the glass substrate, the transparent electrodes and the orientation film.

Figure 5:
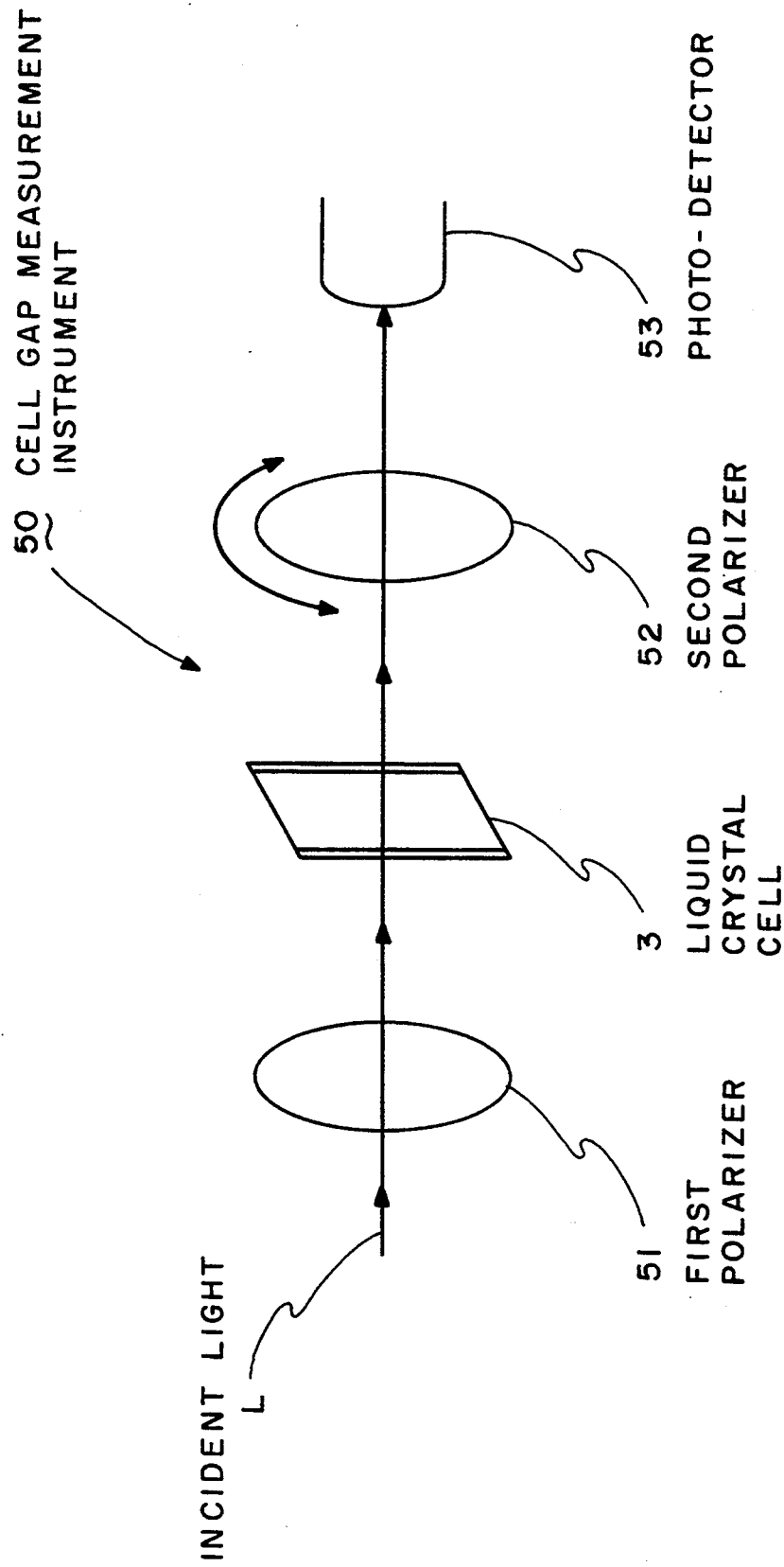
FIG. 5 is a schematic constructive view of another cell gap measurement instrument illustrating the principle of measuring a cell gap of a liquid crystal cell according to a second embodiment of a cell gap measurement method for a birefringent member of the present invention.

Next, the principle of measuring a cell gap of a liquid crystal cell according to the second embodiment of the cell gap measurement method of the present invention is described with reference to a cell gap measurement instrument 50 shown in FIG. 5. The cell gap measurement instrument 50 includes a first polarizer 51 and a second polarizer 52 which are located in an opposing relationship to each other on an optic axis of incident light L, and a photo-detector 53 located on the optic axis of the incident light L on the opposite side of the second polarizer 52 from the first polarizer 51. A liquid crystal cell 3 of twisted nematic structure which is the object for measurement is disposed between the first polarizer 51 and the second polarizer 52. It is to be noted that the polarization direction of the second polarizer 52 is displaced by a predetermined angle from the polarization direction of the first polarizer 51. Further, the second polarizer 52 is disposed for rotation around the optic axis of the incident light L.

If: the electric field component of the incident light L in the X-axis direction, which is perpendicular to the incidence direction of the incident light L, is represented by EX; the electric field component of the incident light L in the Y-axis direction is represented by $E_Y$; the electric field component of transmission light, which is the incident light L transmitted successively through the first polarizer 51, the liquid crystal cell 3 and the second polarizer 52 in the X-axis direction, is represented by $E_{X'}$; the electric field component of the transmission light in the Y-axis direction is represented by $E_{Y'}$; the refractive index anisotropy of the liquid crystal cell 3 is represented by Δn; the twist angle of the liquid crystal cell 3 is represented by $\theta_{TW}$ (in the case of the liquid crystal cell 3 of twisted nematic structure, the twist angle $\theta_{TW}=90°$); the cell gap of the liquid crystal cell 3 is represented by d; the wavelength of the incident light L is represented by λ; the angle formed between the orientation direction of the liquid crystal cell 3 and the polarization direction of the first polarizer 51 is represented by θ; and the rotational angle of the second polarizer 52 (that is, the angle formed between the orientation direction of the liquid crystal cell 3 and the polarization direction of the second polarizer 52) is represented by φ; then the electric field component $E_{X'}$ of the transmission light in the X-axis direction and the electric field component $E_{Y'}$ of the transmission light in the Y-axis direction are represented by the following equation by calculation using the Jones matrix representation:

$$\begin{bmatrix} E_{X'} \\ E_{Y'} \end{bmatrix} = \begin{bmatrix} \cos\phi & \sin\phi \\ -\sin\phi & \cos\phi \end{bmatrix} \cdot \begin{bmatrix} 1 & 0 \\ 0 & 0 \end{bmatrix} \cdot \begin{bmatrix} \cos\phi & -\sin\phi \\ \sin\phi & \cos\phi \end{bmatrix} \cdot \quad (10)$$

$$\begin{bmatrix} \cos\theta & \sin\theta \\ -\sin\theta & \cos\theta \end{bmatrix} \cdot \begin{bmatrix} a & b \\ -b^* & a^* \end{bmatrix} \cdot \begin{bmatrix} \cos\theta & -\sin\theta \\ \sin\theta & \cos\theta \end{bmatrix} \cdot$$

$$\begin{bmatrix} 1 & 0 \\ 0 & 0 \end{bmatrix} \cdot \begin{bmatrix} E_X \\ E_Y \end{bmatrix}$$

Meanwhile, the intensity I of the transmission light detected by the photo-detector 53 is represented by the following equation:

$$I = |E_{X'}|^2 + |E_{Y'}|^2 \quad (11)$$

where the variations a and b in equation (10) above are represented by equations (3) and (4) given hereinabove.

Figure 6:
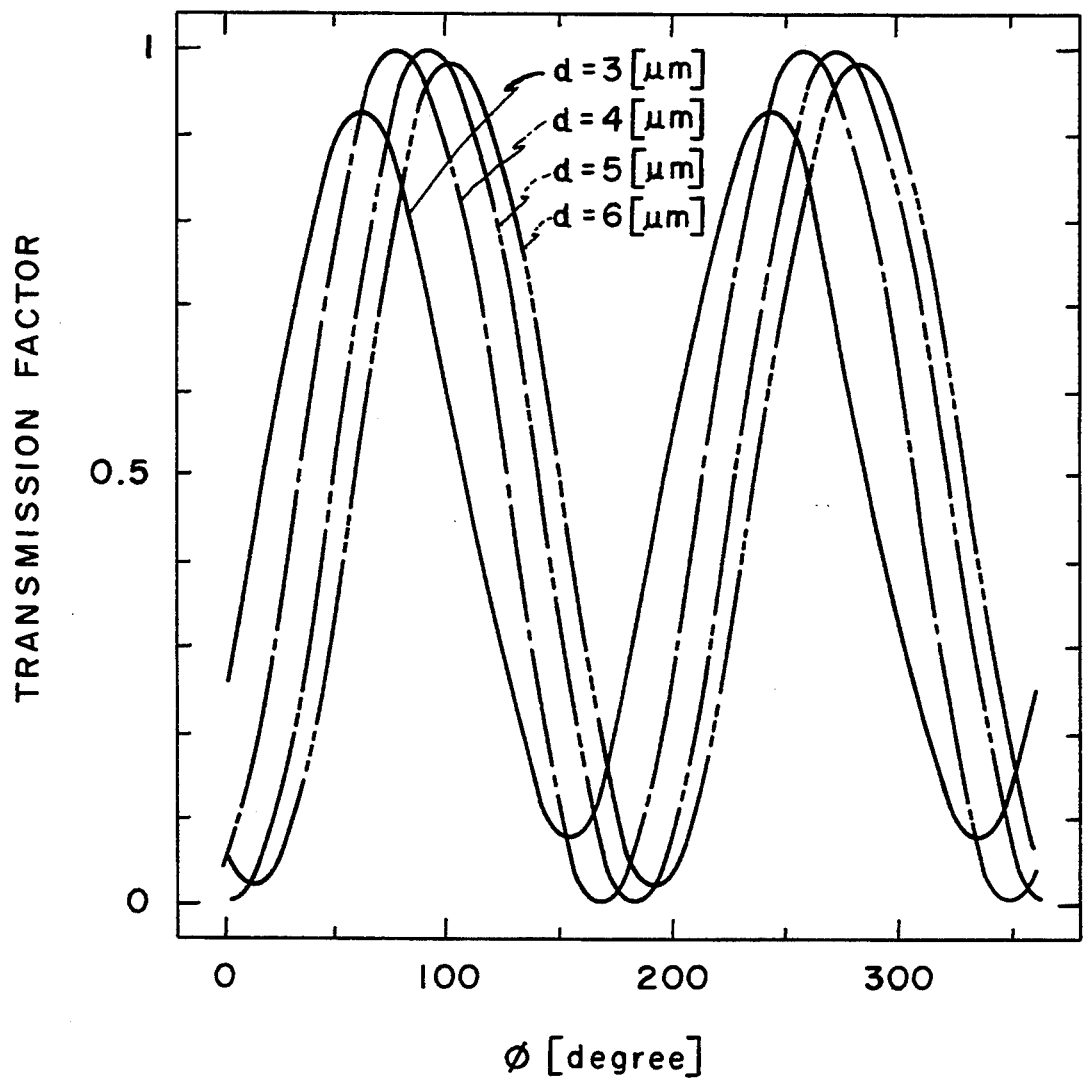
FIG. 6 is a graph showing an example of the result of calculation of the dependency of the transmission factor of transmission light on the rotational angle of a second polarization transmission element with the cell gap measurement instrument shown in FIG. 2.

An example of results of calculation conducted to find the dependency of the transmission factor of the transmission light detected by the photo-detector 53 upon the rotational angle φ of the second polarizer 52 based on equations (10) and (11) using the cell gap d of the liquid crystal cell 3 as a parameter is illustrated in FIG. 6. In this instance, the refractive index anisotropy Δn of the liquid crystal 3 is 0.1; the wavelength λ of the incident light L is 550 nm; the twist angle $\theta_{TW}$ of the liquid crystal cell 3 is 90°; and the angle θ between the orientation direction of the liquid crystal cell 3 and the polarization direction of the first polarizer 51 is 0°. From the results of calculation illustrated in FIG. 6, it can be seen that the cell gap d of the liquid crystal cell 3 can be determined by measuring the transmission factor of the intensity I of the transmission light while rotating the second polarizer 52 to determine the values of the rotational angle φ of the second polarizer 52 at which the transmission factor exhibits minimum and maximum values. It is to be noted that the cell gap d of the liquid crystal cell 3 can be determined similarly even if the first polarizer 51 is rotated around the optic axis of the incident light L instead of the second polarizer 52.

Figure 7:
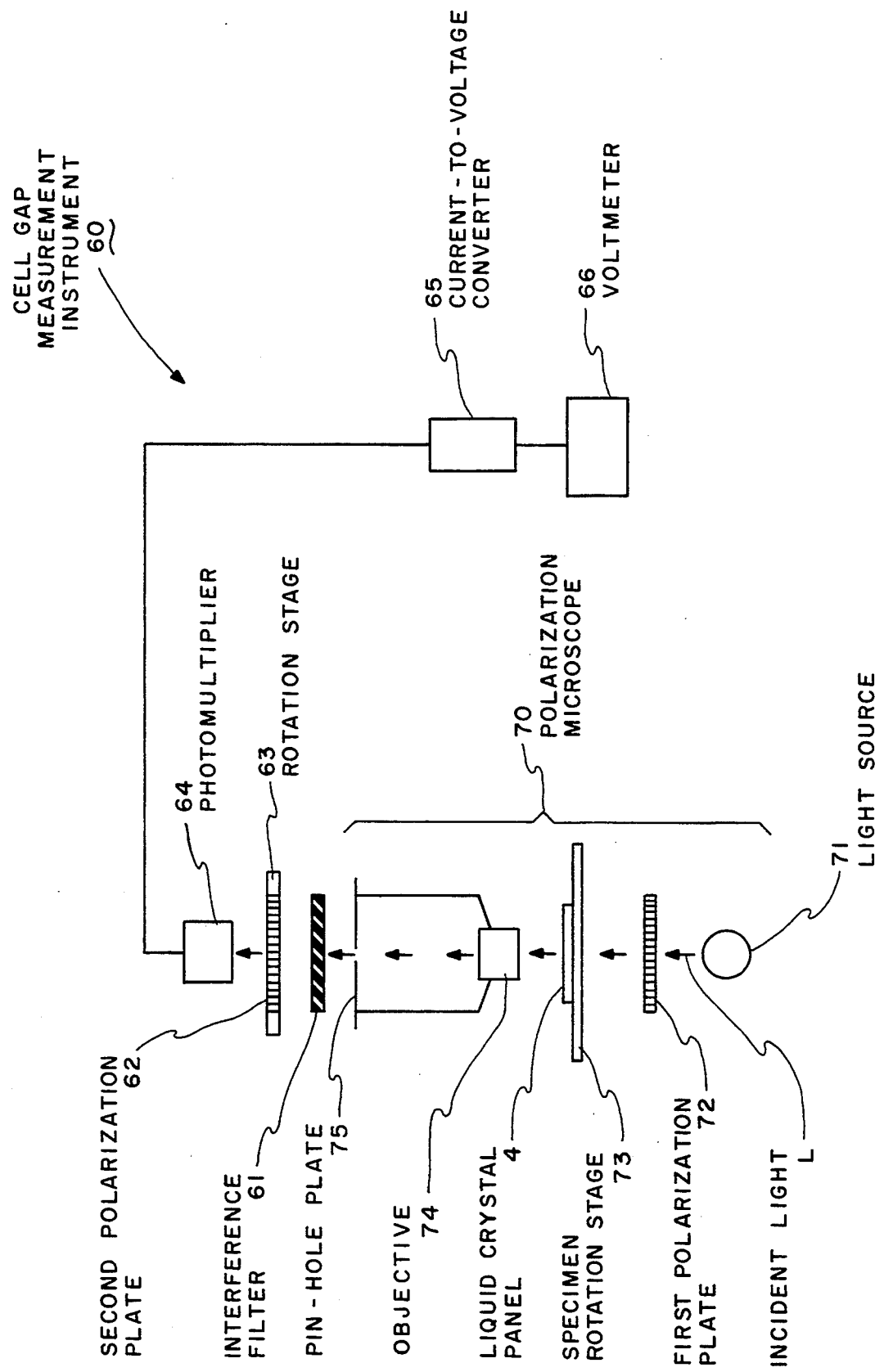
FIG. 7 is a schematic constructive view of a cell gap measurement instrument with which the second embodiment of a cell gap measurement method of the present invention can be realized.

Next, a cell gap measurement instrument with which the second embodiment of the cell gap measurement method of the present invention described above can be realized is described with reference to FIG. 7. A cell gap measurement instrument 60 includes a polarization microscope 70, an interference filter 61, a rotation stage 63 on which a second polarization plate 62 is supported, a photomultiplier 64, a current-to-voltage converter 65, and a voltmeter 66. Here, the polarization microscope 70 includes a light source 71 in the form of a halogen lamp for emitting incident light L, a first polarization plate 72 into which the incident light L emitted from the light source 71 is introduced, a specimen rotation stage 73 into which the incident light L that has passed through the first polarization plate 72 is introduced, an objective 74 into which the incident light L that has passed through the specimen rotation stage 73 is introduced, and a pin-hole plate 75 having a pin-hole into which the incident light L that has passed through the objective 74 is introduced. Through the interference filter 61 passes a component of the incident light L having a fixed wavelength which has been transmitted through the pin-hole of the pin-hole plate 75. The rotation stage 63 is caused to rotate by a stepping motor (not shown). The photomultiplier 64 receives a transmission light, which is the incident light L that has been transmitted through the second polarization plate 62, and converts it into a current signal. The current-to-voltage converter 65 converts the current signal outputted from the photomultiplier 64 into a voltage signal. The voltmeter 66 reads the voltage value of the voltage signal outputted from the current-to-voltage converter 65. A liquid crystal panel 4 which is an object for measurement is placed on the specimen rotation stage 73 in such a manner that the rubbing direction of the liquid crystal of twisted nematic structure coincides with the polarization direction of the first polarization plate 72. The liquid crystal panel 4 has a color filter and is driven by amorphous silicon thin film transistors.

Next, a method of measuring a cell gap d of the liquid crystal cell constituting the liquid crystal panel 4 using the cell gap measurement instrument 60 is described in detail. Where the rotational angle when the second polarization plate 62 is rotated by the rotation stage 63 is represented by $\phi$, the intensity of the transmission light, which is the incident light L introduced into the photomultiplier 64 after successive transmission through the first polarization plate the specimen rotation stage 73, the liquid crystal panel 4, the objective 74, the pin-hole of the pin-hole plate 75, the interference filter 61 and the second polarization plate 62 after being emitted from the light source 71, is represented by the following equation:

$$I = I_0 + I_S \sin 2\phi + I_C \cos 2\phi \quad (12)$$
$$= I_0 + \sqrt{I_S^2 + I_C^2} \sin(2\phi + \Delta)$$

where $$\sin\Delta = \frac{I_C}{\sqrt{I_S^2 + I_C^2}} \quad (13)$$

It is to be noted that the intensities $I_O$, $I_S$ and $I_C$ in equation (12) are represented by the following equations (14) to (16), respectively, when the variable u represented by equation (5) described hereinabove is used.

$$I_O = 1/2 \quad (14)$$

$$I_S = -\frac{\sin(\pi\sqrt{u^2+1})}{2\sqrt{u^2+1}} \quad (15)$$

$$I_C = -\frac{\cos(\pi\sqrt{u^2+1})}{2(u^2+1)} - \frac{u^2}{2(u^2+1)} \quad (16)$$

Figure 8:
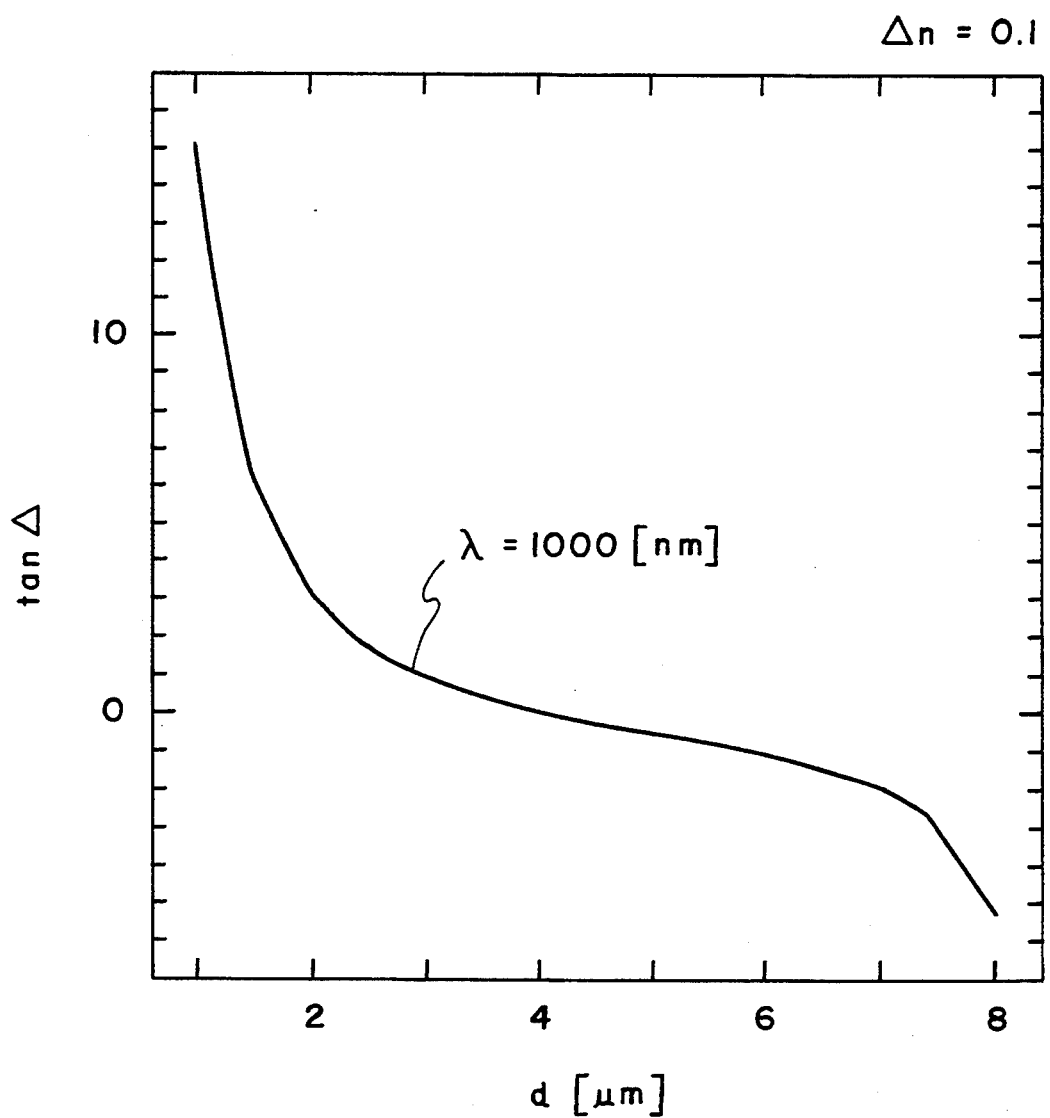
FIG. 8 is a graph showing an example of the result of calculation of the relationship between tangent function $\tan(\Delta)$ of variable $\Delta$ and a cell gap of a liquid crystal cell with the cell gap measurement instrument shown in FIG. 7.

An example of results of calculation wherein the relationship between tangent function tan(Δ) of the variable Δ and the cell gap d of the liquid crystal cell constituting the liquid crystal panel 4 when the intensity I of the transmission light represented by equation (12) presents a maximum value where the refractive index anisotropy Δn of the liquid crystal cell constituting the liquid crystal panel 4 is 0.1, the wavelength λ of the incident light L is 1,000 nm and the twist angle $\theta_{TW}$ of the liquid crystal cell constituting the liquid crystal panel 4 is illustrated in FIG. 8. The value of variable Δ when the intensity I of the transmission light exhibits its maximum value is represented, from equation (12), by the following equation:

$$\Delta = 2\cdot\phi - 90° \quad (17)$$

Thus, the variable Δ corresponds to the transmission factor of the transmission light.

Accordingly, the rotational angle $\phi$ of the second polarization plate 62 at which the intensity I of the transmission light exhibits its maximum value can be determined by calculating the rotational angle $\phi$ of the second polarization plate 62 when the voltage value obtained from the voltmeter 66 exhibits its maximum value while the second polarization plate 62 is rotated one rotation by the rotation stage 63. As a result, the value of the variable Δ when the intensity I of the transmission light exhibits its maximum value is determined based on equation (17), and consequently, the cell gap d of the liquid crystal cell can be determined from the graph shown in FIG. 8. As an example, an experiment was conducted for the liquid crystal panel 4 formed from a liquid crystal cell having a cell gap of 5.3 μm. The experiment revealed that the rotational angle $\phi$ of the second polarization plate 62 at which the intensity I of the transmission light exhibited its maximum value is 60.5°. As a result, the value of the variable Δ determined from equation (17) is 31 (tan(Δ)=0.6), and 5.3 μm is obtained as the cell gap d of the liquid crystal cell from the graph illustrated in FIG. 8.

In the above description of the method of measuring the cell gap d of the liquid crystal cell constituting the liquid crystal panel 4 using the cell gap measurement instrument 60, the rotational angle $\phi$ of the second polarization plate 62 when the voltage obtained on the voltmeter 66 exhibits its maximum value while the second polarization plate 62 is rotated one rotation by the rotation stage 63 is calculated to determine the rotational angle $\phi$ of the second polarization plate 62 at which the intensity I of the transmission light exhibits its maximum value. In this instance, however, the cell gap d of the liquid crystal cell constituting the liquid crystal panel 4 can also be determined similarly by calculating the rotational angle $\phi$ of the second polarization plate 62 when the voltage obtained on the voltmeter 66 exhibits its minimum value to determine the rotational angle $\phi$ of the second polarization plate 62 at which the intensity I of the transmission light exhibits its minimum value.

Figure 9:
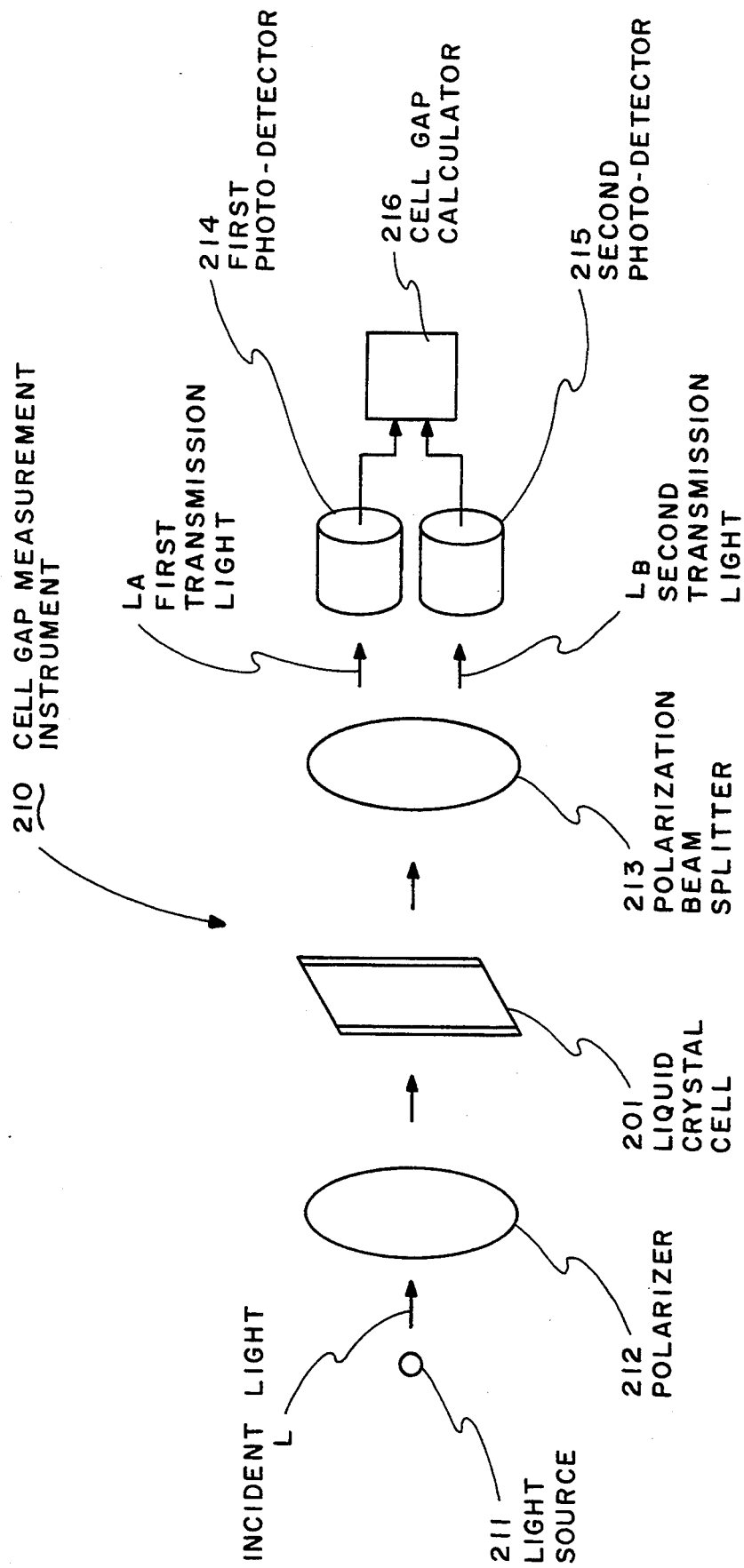
FIG. 9 is a schematic constructive view of a cell gap measurement instrument showing a first embodiment of a cell gap measurement instrument for a birefringent member of the present invention.

Next, the first embodiment of a cell gap measurement instrument of the present invention is described with reference to FIG. 9. A cell gap measurement instrument 210 includes a light source 211 for emitting incident light L, a polarizer 212 into which the incident light L emitted from the light source 211 is introduced, a polarization beam splitter 213, a first photo-detector 214, a second photo-detector 215 and a cell gap calculator 216. A liquid crystal cell 201 of twisted nematic structure which is the object for measurement is interposed between the polarizer 212 and the polarization beam splitter 213. Here, the polarizer 212 has a polarization direction of an angle $\Phi$. The polarization beam splitter 213 has two different angles of polarization direction (an angle $\Phi_A$ of the first polarization direction and an angle $\Phi_B$ of the second polarization direction) and separates the incident light L, which has passed through the polarizer 212 and the liquid crystal cell 201, into first transmission light $L_A$ and second transmission light $L_B$ with a polarization angle of $\Phi_A - \Phi_B$. The polarization beam splitter 213 thus emits the first transmission light $L_A$ and the second transmission light $L_B$. The first photo-detector 214 detects the intensity of the first transmission light $L_A$ emitted from the polarization beam splitter 213. The second photo-detector 215 detects the intensity of the second transmission light $L_B$ emitted from the polarization beam splitter 213. The cell gap calculator 216 calculates the cell gap of the liquid crystal cell 201 from the ratio between the intensity of the first transmission light $L_A$ detected by the first photo-detector 214 and the intensity of the second transmission light $L_B$ detected by the second photo-detector 215.

If: the electric field component of the incident light L in the X-axis direction, which is perpendicular to the incidence direction of the incident light L, is represented by $E_X$, the electric field component of the incident light L in the Y-axis direction is represented by $E_Y$, the electric field component of the first transmission light $L_A$ in the X-axis direction is represented by $E_{XA}$, the electric field component of the first transmission light $L_A$ in the Y-axis direction is represented by $E_{YA}$, the electric field component of the second transmission light $L_B$ in the X-axis direction is represented by $E_{XB}$, the electric field component of the second transmission light $L_B$ in the Y-axis direction is represented by $E_{YB}$, the refractive index anisotropy of the liquid crystal cell 201 is represented by $\Delta n$, the twist angle of the liquid crystal cell 201 is represented by $\theta_{TW}$ (in the case of the liquid crystal cell 201 of twisted nematic structure, the twist angle $\theta_{TW}=90°$), the cell gap of the liquid crystal cell 201 is represented by d, the wavelength of the incident light L is represented by $\lambda$, and the angle formed between the orientation direction of the liquid crystal cell 201 and the polarization direction of the polarizer 212 is represented by $\theta$; then the electric field component $E_{XA}$ of the first transmission light $L_A$ in the X-axis direction and the electric field component $E_{YA}$ of the first transmission light $L_A$ in the Y-axis direction as well as the electric field component $E_{XB}$ of the second transmission light $L_B$ in the X-axis direction and the electric field component $E_{YB}$ of the second transmission light $L_B$ in the Y-axis direction are represented by equations (18) and (19) below by calculation using the Jones matrix representation:

$$\begin{bmatrix} E_{XA} \\ E_{YA} \end{bmatrix} = R_{(\Phi_A)}^{-1} \cdot \begin{bmatrix} 1 & 0 \\ 0 & 1 \end{bmatrix} \cdot R_{(\Phi_A)} \cdot R_{(\theta)}^{-1} \cdot \begin{bmatrix} a & b \\ -b^* & a^* \end{bmatrix} \cdot \quad (18)$$

$$R_{(\theta)} \cdot R_{(\Phi_A)}^{-1} \cdot \begin{bmatrix} 1 & 0 \\ 0 & 0 \end{bmatrix} \cdot R_{(\Phi)} \cdot \begin{bmatrix} E_X \\ E_Y \end{bmatrix}$$

$$\begin{bmatrix} E_{XB} \\ E_{YB} \end{bmatrix} = R_{(\Phi_B)}^{-1} \cdot \begin{bmatrix} 1 & 0 \\ 0 & 0 \end{bmatrix} \cdot R_{(\Phi_B)} \cdot R_{(\theta)}^{-1} \cdot \begin{bmatrix} a & b \\ -b^* & a^* \end{bmatrix} \cdot \quad (19)$$

$$R_{(\theta)} \cdot R_{(\Phi_B)}^{-1} \cdot \begin{bmatrix} 1 & 0 \\ 0 & 0 \end{bmatrix} \cdot R_{(\Phi)} \cdot \begin{bmatrix} E_X \\ E_Y \end{bmatrix}$$

where $$R_{(q)} = \begin{bmatrix} \cos q & -\sin q \\ \sin q & \cos q \end{bmatrix}$$

Meanwhile, where the intensity of tile first transmission light $L_A$ detected by the first photo-detector 214 is represented by $I_A$ and the intensity of the second transmission light $L_B$ detected by tile second photo-detector is represented by $I_B$, the intensity $I_A$ of the first transmission light $L_A$ and the intensity $I_B$ of the second transmission light $L_B$ are represented by equations (21) and (22), respectively:

$$I_A = |E_{XA}|^2 + |E_{YA}|^2 \quad (21)$$

$$I_B = |E_{XB}|^2 + |E_{YB}|^2 \quad (22)$$

Here, the variables a and b in equations (18) and (19) are complex numbers and represented by equations (23) and (24) below:

$$a = \frac{1}{\sqrt{1+u^2}} \sin\theta_{TW}\sin(\sqrt{1+u^2}\,\theta_{TW}) + \quad (21)$$

$$\cos(\sqrt{1+u^2}\,\theta_{TW}) +$$

$$i\frac{u}{\sqrt{1+u^2}} \cos\theta_{TW}\sin(\sqrt{1+u^2}\,\theta_{TW})$$

$$b = \frac{1}{\sqrt{1+u^2}} \cos\theta_{TW}\sin(\sqrt{1+u^2}\,\theta_{TW}) + \quad (24)$$

$$\sin\theta_{TW}\cos(\sqrt{1+u^2}\,\theta_{TW}) -$$

$$i\frac{u}{\sqrt{1+u^2}} \sin\theta_{TW}\sin(\sqrt{1+u^2}\,\theta_{TW})$$

where $$u = \frac{\pi d}{\lambda \theta_{TW}} \Delta n \quad (25)$$

It is to be noted that variables a* and b* in equations (18) and (19) represent complex conjugate numbers with the variables a and b.

If it is assumed for simplified description that the polarization angle $\Phi_A - \Phi_B$ of the polarization beam splitter 212 is 90°, then from the fact that the twist angle $\theta_{TW}$ of the liquid crystal cell 201 is 90°, the intensity $I_A$ of the first transmission light $L_A$ and the intensity $I_B$ of the second transmission light $L_B$ are represented by equations (26) and (27), respectively:

$$I_A = \frac{(4u^2\cos^4\theta - 4u^2\cos^2\theta - 1)\{\cos(\pi\sqrt{u^2+1}) - 1\}}{2(u^2+1)} \quad (26)$$

$$I_B = -\frac{(4u^2\cos^4\theta - 4u^2\cos^2\theta - 1)\cos(\pi\sqrt{u^2+1}) - 4u^2\cos^4\theta + 4u^2\cos^2\theta - 2u^2 - 1}{2(u^2+1)} \quad (27)$$

Figure 10:
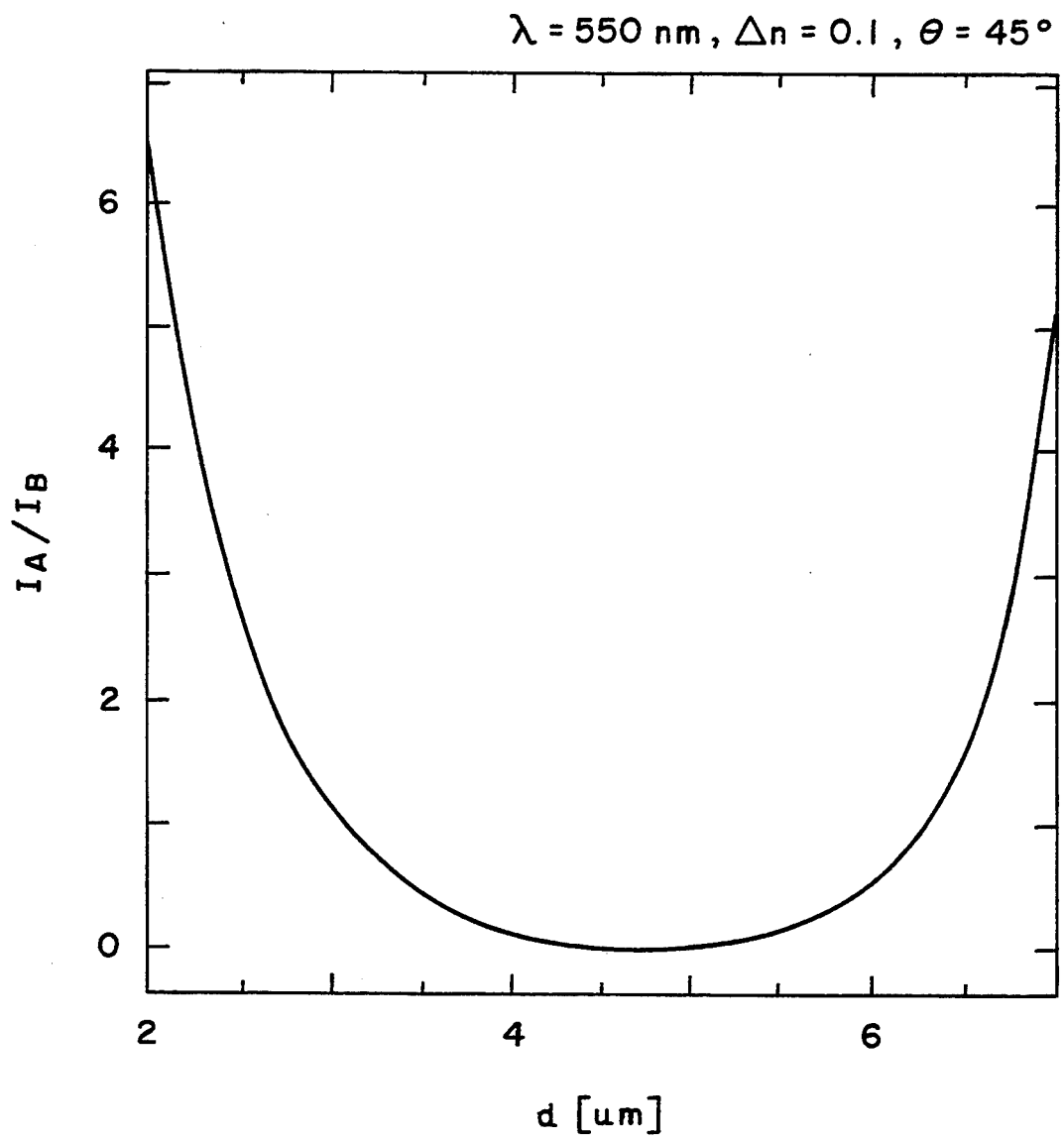
FIG. 10 is a graph showing an example of the result of calculation of the relationship between an intensity ratio and a cell gap of a liquid crystal cell conducted using incident light of a short wavelength with the cell gap measurement instrument shown in FIG. 9.

An example of the results of calculation conducted to find, using equations (26) and (27), the relationship between the ratio between the intensity $I_A$ of the first transmission light $L_A$ and the intensity $I_B$ of the second transmission light $L_B$ (hereinafter referred to as the intensity ratio $I_A/I_B$) and the cell gap d of the liquid crystal cell 201 when the wavelength $\lambda$ of the incident light L is 550 nm and the refractive index anisotropy $\Delta n$ of the liquid crystal 201 is 0.1 and the liquid crystal cell 201 is then fixed so that the angle $\theta$ formed between the orientation direction of the liquid crystal cell 201 and the polarization direction of the polarizer 212 is 45° is illustrated in FIG. 10. Meanwhile, another example of a result of calculation conducted to find, using equations (26) and (27), the relationship between the intensity ratio $I_A/I_B$ and the cell gap d of the liquid crystal cell 201 when the wavelength $\lambda$ of the incident light L is 1,000 nm and the refractive index anisotropy $\Delta n$ of the liquid crystal 201 is 0.1 and the liquid crystal cell 201 is then fixed so that the angle $\theta$ formed between the orientation direction of the liquid crystal cell 201 and the polarization direction of the polarizer 212 is 45° is illustrated in FIG. 11.

Figure 11:
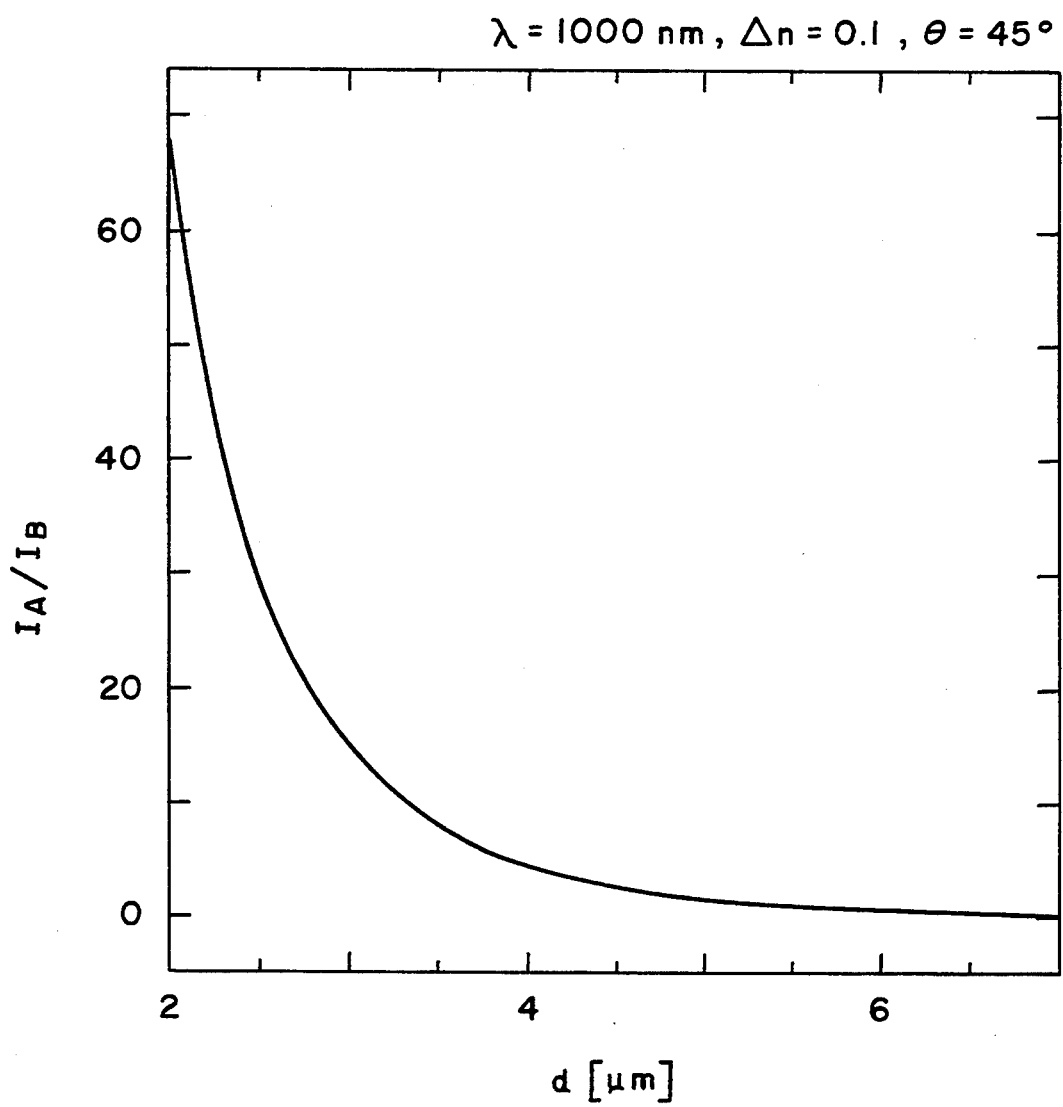
FIG. 11 is a graph showing an example of the result of calculation of the relationship between an intensity ratio and a cell gap of a liquid crystal cell conducted using incident light of a long wavelength with the cell gap measurement instrument shown in FIG. 9.

Accordingly, by calculating the intensity ratio $I_A/I_B$ using the cell gap calculator 216, the cell gap d of the liquid crystal cell 201 can be determined from the results of calculation illustrated in FIGS. 10 and 11. However, according to the result of calculation illustrated in FIG. 10, the cell gap d of the liquid crystal cell 201 has two values corresponding to the calculated intensity ratio $I_A/I_B$. However, since the relationship between the intensity ratio $I_A/I_B$ and the cell gap d of the liquid crystal cell 210 varies in accordance with the wavelength $\lambda$ of the incident light L, by again calculating the intensity ratio $I_A/I_B$ varying the wavelength $\lambda$ of the incident light L, the cell gap d of the liquid crystal cell 201 can be specified from the two intensity ratios thus calculated. Meanwhile, when the upper limit of the cell gap d of the liquid crystal cell 201 is known in advance, by measuring the intensity ratio $I_A/I_B$ using the incident light L having wavelength $\lambda$ of 1,000 nm, the cell gap d of the liquid crystal cell 201 can be calculated by a single measurement operation as seen from FIG. 11.

Figure 12:
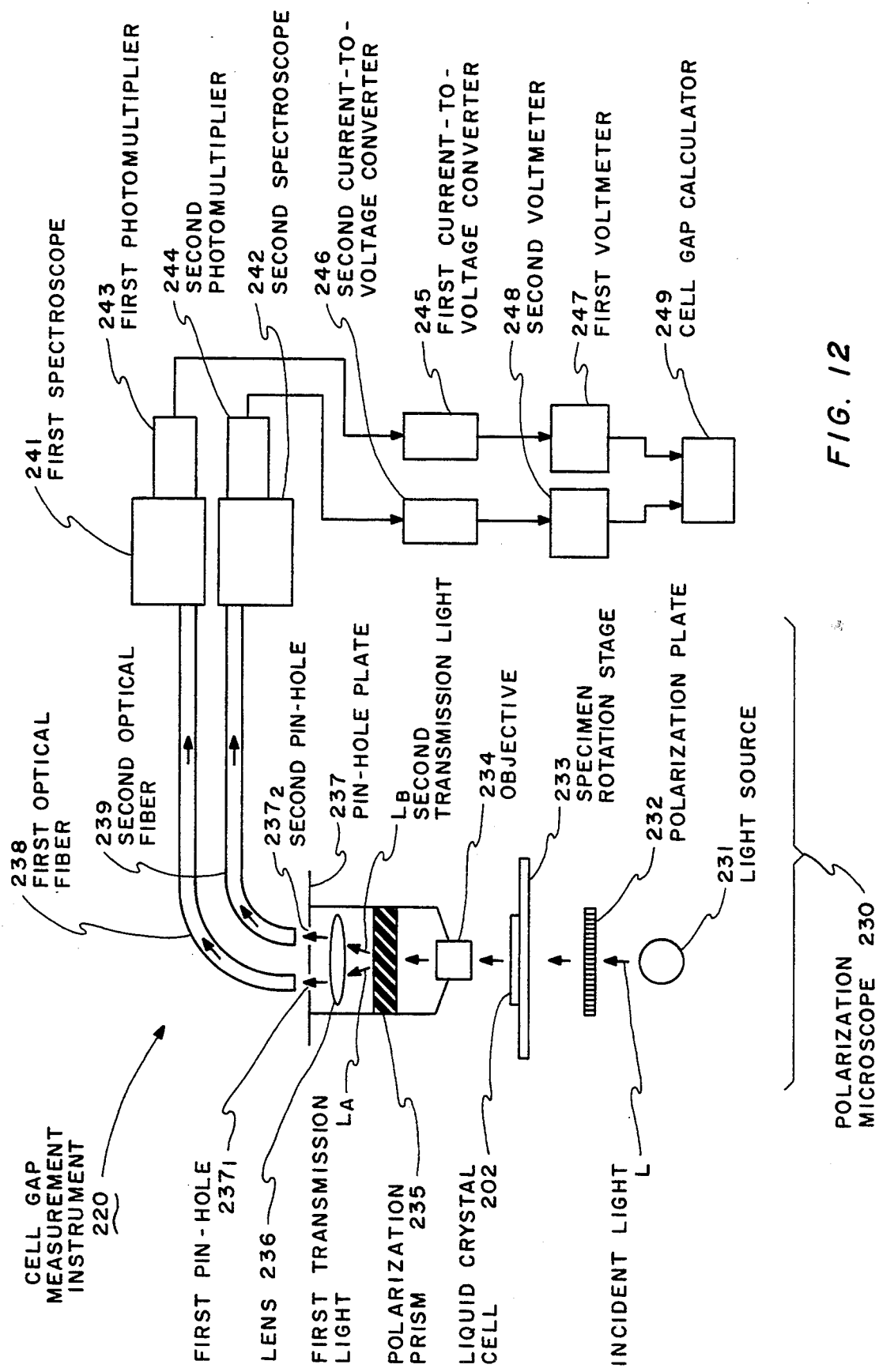
FIG. 12 is a detailed constructive view of a cell gap measurement instrument according to the first embodiment of a cell gap measurement instrument of the present invention.

Next, a concrete example of a cell gap measurement instrument according to the first embodiment of the cell gap measurement instrument of the present invention described above is described with reference to FIG. 12. A cell gap measurement instrument 220 includes a polarization microscope 230, a first spectroscope 241, a second spectroscope 242, a first photomultiplier 243, a second photomultiplier 244, a first current-to-voltage converter 245, a second current-to-voltage converter 246, a first voltmeter 247, a second voltmeter 248, and a cell gap calculator 249. Here, the polarization microscope 230 includes a light source 231 formed from a halogen lamp for emitting incident light L, a polarization plate 232 into which the incident light L emitted from the light source 231 is introduced, a specimen rotation stage 233 into which the incident light L that has passed through the polarization plate 232 is introduced, an objective 234 into which the incident light L that has passed through the specimen rotation stage 233 is introduced, a polarization prism 235 in the form of a Wollaston prism into which the incident light L that has passed through the objective 234 is introduced which separates the incident light L into first transmission light $L_A$ and second transmission light $L_B$ with a polarization angle of 90° and emits the first transmission light $L_A$ and the second transmission light $L_B$, a lens 236 into which the first transmission light $L_A$ and the second transmission light $L_B$ emitted from the polarization prism 235 are introduced, a pin-hole plate 237 having first and second pin-holes $237_1$ and $237_2$ into which the first transmission light $L_A$ and the second transmission light $L_B$ that have passed through the lens 236 are introduced, a first optical fiber 238 for introducing the first transmission light $L_A$ emitted from the first pin-hole $237_1$ into the first spectroscope 241, and a second optical fiber 239 for introducing the second transmission light $L_B$ emitted from the second pin-hole $237_2$ into the second spectroscope 242. The first spectroscope 241 spectrally separates the first transmission light $L_A$ introduced into it by way of the first optical fiber 238 to extract only light of a predetermined wavelength. The second spectroscope 242 spectrally separates the second transmission light $L_B$ introduced, into it by way of the second optical fiber 239 to extract only light of the predetermined wavelength. The first photomultiplier 243 converts light extracted by the first spectroscope 241 into a current signal. The second photomultiplier 244 converts light extracted by the second spectroscope 242 into another current signal. The first current-to-voltage converter 245 converts the current signal outputted from the first photomultiplier 243 into a voltage signal. The second current-to-voltage converter 246 converts the current signal outputted from the second photomultiplier 244 into another voltage signal. The first voltmeter 247 reads the voltage value of the voltage signal outputted from the first current-to-voltage converter 245. The second voltmeter 248 reads the voltage value of the voltage signal outputted from the second current-to-voltage converter 246. The cell gap calculator 249 calculates the cell gap of liquid crystal cell 202 from the voltage value read on the first voltmeter 247 and the voltage value read on the second voltmeter 248. The liquid crystal panel 202 of twisted nematic structure which is the object for measurement is placed on the specimen rotation stage 233.

It is to be noted that a liquid crystal cell manufactured in the following manner was employed for the liquid crystal cell 202: A pair of glass substrates each having on a surface thereof transparent electrodes made of an ITO ($In_2O_3 + SnO_2$) thin film were prepared, and an orientation film was applied to each of the glass substrates, whereafter rubbing processing was applied to each glass substrate. The glass substrates were then adhered to each other with spacers of a diameter of 5 $\mu m$ interposed between them in such a manner that the rubbing directions might be perpendicular to each other, and liquid crystal was then injected between the glass substrates.

In the cell gap measurement instrument 220 having the construction described above, the incident light L emitted from the light source 231 is successively transmitted through the polarization plate 232, the specimen rotation stage 233, the liquid crystal cell 202 and the objective 234, and enters the polarization prism 235. The incident light L entering the polarization prism 235 is separated into the first transmission light $L_A$ and the second transmission light $L_B$ which are emitted from the polarization prism 235. The first transmission light $L_A$ emitted from the polarization prism 235 is successively transmitted through the lens 236 and the first pin-hole $237_1$ and then is introduced into the first spectroscope 241 through the first optical fiber 238. The first transmission light $L_A$ is spectrally separated by the first spectroscope 241 to obtain monochromatic light. The monochromatic light is introduced into the first photomultiplier 243, in which it is converted into a current signal. The current signal after conversion is inputted as the first current-to-voltage converter 245, in which it is converted into a voltage signal. The voltage signal after conversion is inputted to the first voltmeter 247, on which the voltage value is read. Meanwhile, the second transmission light $L_B$ emitted from the polarization prism 235 is successively transmitted through the lens 236 and the second pin-hole $237_2$ and then is introduced into the second spectroscope 272 through the second optical fiber 239. The second transmission light $L_B$ is spectrally separated by the second spectroscope 242 to again obtain monochromatic light. The monochromatic light is introduced into the second photomultiplier 244, in which it is converted into another current signal. The current signal after conversion is inputted as the second current to the voltage converter 246, in which it is converted into another voltage signal. The voltage signal after conversion is inputted to the second voltmeter 248, on which the voltage value is read.

Next, a method of calculating the cell gap d of the liquid crystal cell 202 from the voltage value read on the first voltmeter 247 and the voltage value read on the second voltmeter 248 by means of the cell gap calculator 249 is described. Before the liquid crystal cell 202 is placed onto the specimen rotation stage 233, both the wavelength of light to be extracted by the first spectroscope 241 and the wavelength of light to be extracted by the second spectroscope 242 are set to 550 nm, and the polarization plate 232 is rotationally adjusted so that the voltage value read on the first voltmeter 247 is at a minimum to thereby adjust one of the two polarization directions of the polarization prism 235 and the polarization direction of the polarization plate 232 such that they are perpendicular to each other. Thereafter, the liquid crystal cell 202 is placed onto the specimen rotation stage 233, and the voltage value is read on the first voltmeter 247 while rotating the specimen rotation stage 233 until the position at which the voltage value read on the first voltmeter 247 exhibits its maximum value, at which point rotation of the specimen rotation stage 233 is stopped. The cell gap calculator 249 then calculates the ratio between the voltage value read on the first voltmeter 247 and the voltage value read on the second voltmeter 248. The ratio calculated then corresponds to the intensity ratio $I_A/I_B$ between the intensity $I_A$ of the first transmission light $L_A$ and the intensity $I_B$ of the second transmission light $L_B$, and consequently, the cell gap d of the liquid crystal cell 202 can be determined in a similar manner as with the cell gap measurement instrument 210 shown in FIG. 9.

An example of the results of measurement wherein the cell gap d was measured using the cell gap measurement instrument 220 for five liquid crystal cells produced in the manner described above is illustrated in Table 2. It is to be noted that, for comparison, Table 2 shows estimation values of the cell gap of the liquid crystal cell estimated from the known dielectric constant, cell area and electric capacitance of the liquid crystal cell 202.

TABLE 2

| Cell No. | Results of Measurement | |
|---|---|---|
| | Measurement Value with Present Equipment | Estimated Value |
| TN2 | 4.8 μm | 4.8 μm |
| TN3 | 4.8 | 4.8 |
| TN6 | 4.8 | 4.7 |
| TN8 | 4.8 | 4.7 |
| TN9 | 4.7 | 4.6 |

From the results of measurement, it can be seen that the measurement values of the cell gap d of the liquid crystal cell 202 measured using the cell gap measurement instrument 220 coincide well with the estimated values of the cell gap estimated from the known dielectric constant, cell area and electric capacitance of the liquid crystal cell 202.

Figure 13:
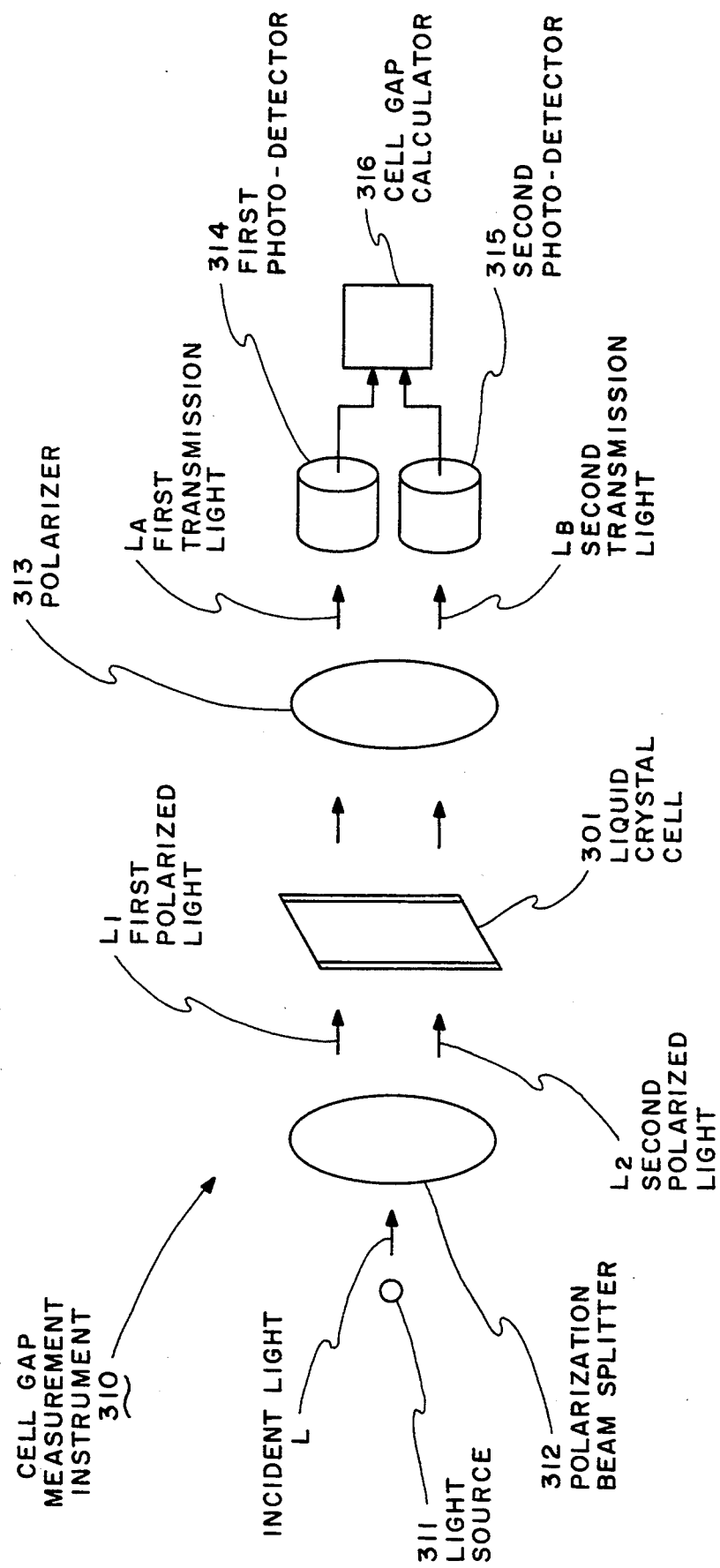
FIG. 13 is a schematic constructive view of another cell gap measurement instrument showing a second embodiment of a cell gap measurement instrument for a birefringent member of the present invention.

Next, the second embodiment of a cell gap measurement instrument of the present invention is described with reference to FIG. 13. A cell gap measurement instrument 310 includes a light source 311 for emitting incident light L, a polarization beam splitter 312 into which the incident light L emitted from the light source 311 is introduced, a polarizer 313, a first photo-detector 314, a second photo-detector 315, and a cell gap calculator 316. It is to be noted that a liquid crystal cell 301 of twisted nematic structure, which is the object for measurement, is interposed between the polarization beam splitter 312 and the polarizer 313. Here, the polarization beam splitter 312 has two different angles of polarization directions (angle $\Phi_A$ of the first polarization direction and angle $\Phi_B$ of the second polarization direction) and separates the incident light L introduced into it from the light source 311 into first polarized light $L_1$ and second polarized light $L_2$ with a polarization angle of $\Phi_A - \Phi_B$. The polarizer 313 has a polarization direction of an angle $\Phi$ and converts the first polarized light $L_1$ and the second polarized light $L_2$, which have been transmitted through the liquid crystal cell 301, into first transmission light $L_A$ and second transmission light $L_B$, respectively, which are thus emitted from the polarizer 313. The first photo-detector 314 detects the intensity of the first transmission light $L_A$ emitted from the polarizer 313. The second photo-detector 315 detects the intensity of the second transmission light $L_B$ emitted from the polarizer 13. The cell gap calculator 316 calculates the cell gap of the liquid crystal cell 301 from the ratio between the intensity of the first transmission light $L_A$ detected by the first photo-detector 314 and the intensity of the second transmission light $L_B$ detected by the second photo-detector 315.

If: the electric field component of the incident light L in the X-axis direction, which is perpendicular to the incidence direction of the incident light L, is represented by $E_X$, the electric field component of the incident light L in the Y-axis direction is represented by $E_Y$, the electric field component of the first transmission light $L_A$ in the X-axis direction is represented by $E_{XA}$, the electric field component of the first transmission light $L_A$ in the Y-axis direction is represented by $E_{YA}$, the electric field component of the second transmission light $L_B$ in the X-axis direction is represented by $E_{XB}$, the electric field component of the second transmission light $L_B$ in the Y-axis direction is represented by $E_{YB}$, the refractive index anisotropy of the liquid crystal cell 301 is represented by $\Delta n$, the twist angle of the liquid crystal cell 301 is represented by $\theta_{TW}$ (in the case of the liquid crystal cell 301 of twisted nematic structure, the twist angle $\theta_{TW}=90°$), the cell gap of the liquid crystal cell 301 is represented by d, the wavelength of the incident light L is represented by $\lambda$, and the angle of the orientation direction of the liquid crystal cell 301 is represented by $\theta$; then the electric field component $E_{XA}$ of the first transmission light $L_A$ in the X-axis direction and the electric field component $E_{YA}$ of the first transmission light $L_A$ in the Y-axis direction as well as the electric field component $E_{XB}$ of the second transmission light $L_B$ in the X-axis direction and the electric field component $E_{YB}$ of the second transmission light $L_B$ in the Y-axis direction can be represented by equations (28) and (29) below by calculation using the Jones matrix representation:

$$\begin{bmatrix} E_{XA} \\ E_{YA} \end{bmatrix} = R_{(\Phi_A)}^{-1} \cdot \begin{bmatrix} 1 & 0 \\ 0 & 0 \end{bmatrix} \cdot R_{(\Phi)} \cdot R_{(\theta)}^{-1} \cdot \begin{bmatrix} a & b \\ -b^* & a^* \end{bmatrix} \cdot \quad (28)$$

$$R_{(\theta)} \cdot R_{(\Phi_A)}^{-1} \cdot \begin{bmatrix} 1 & 0 \\ 0 & 0 \end{bmatrix} \cdot R_{(\Phi_A)} \cdot \begin{bmatrix} E_X \\ E_Y \end{bmatrix}$$

$$\begin{bmatrix} E_{XB} \\ E_{YB} \end{bmatrix} = R_{(\Phi)}^{-1} \cdot \begin{bmatrix} 1 & 0 \\ 0 & 0 \end{bmatrix} \cdot R_{(\Phi)} \cdot R_{(\theta)}^{-1} \cdot \begin{bmatrix} a & b \\ -b^* & a^* \end{bmatrix} \cdot \quad (29)$$

$$R_{(\theta)} \cdot R_{(\Phi_B)}^{-1} \cdot \begin{bmatrix} 1 & 0 \\ 0 & 0 \end{bmatrix} \cdot R_{(\Phi_B)} \cdot \begin{bmatrix} E_X \\ E_Y \end{bmatrix}$$

Meanwhile, the intensity $I_A$ of the first transmission light $L_A$ detected by the first photo-detector 314 and the intensity $I_B$ of the second transmission light $L_B$ detected by the second photo-detector 315 can be represented by equations (30) and (31), respectively:

$$I_A = |E_{XA}|^2 + |E_{YA}|^2 \quad (30)$$

$$I_B = |E_{XB}|^2 + |E_{YB}|^2 \quad (31)$$

Here, the variables a and b and the function R in equations (28) and (29) are same as those described hereinabove.

Figure 14:
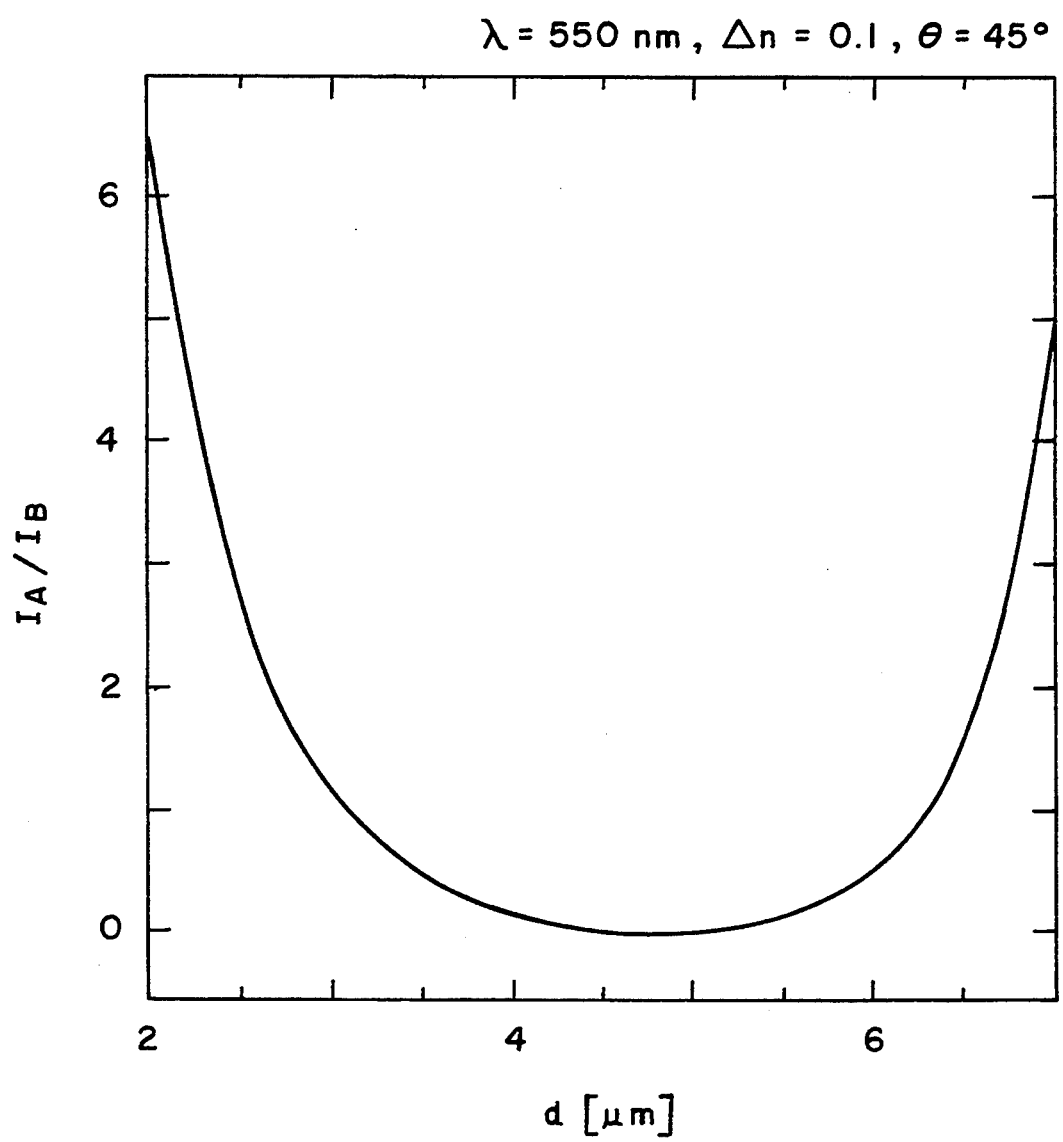
FIG. 14 is a graph showing an example of the result of calculation of the relationship between an intensity ratio and a cell gap of a liquid crystal cell conducted using incident light of a short wavelength with the cell gap measurement instrument shown in FIG. 13.
Figure 15:
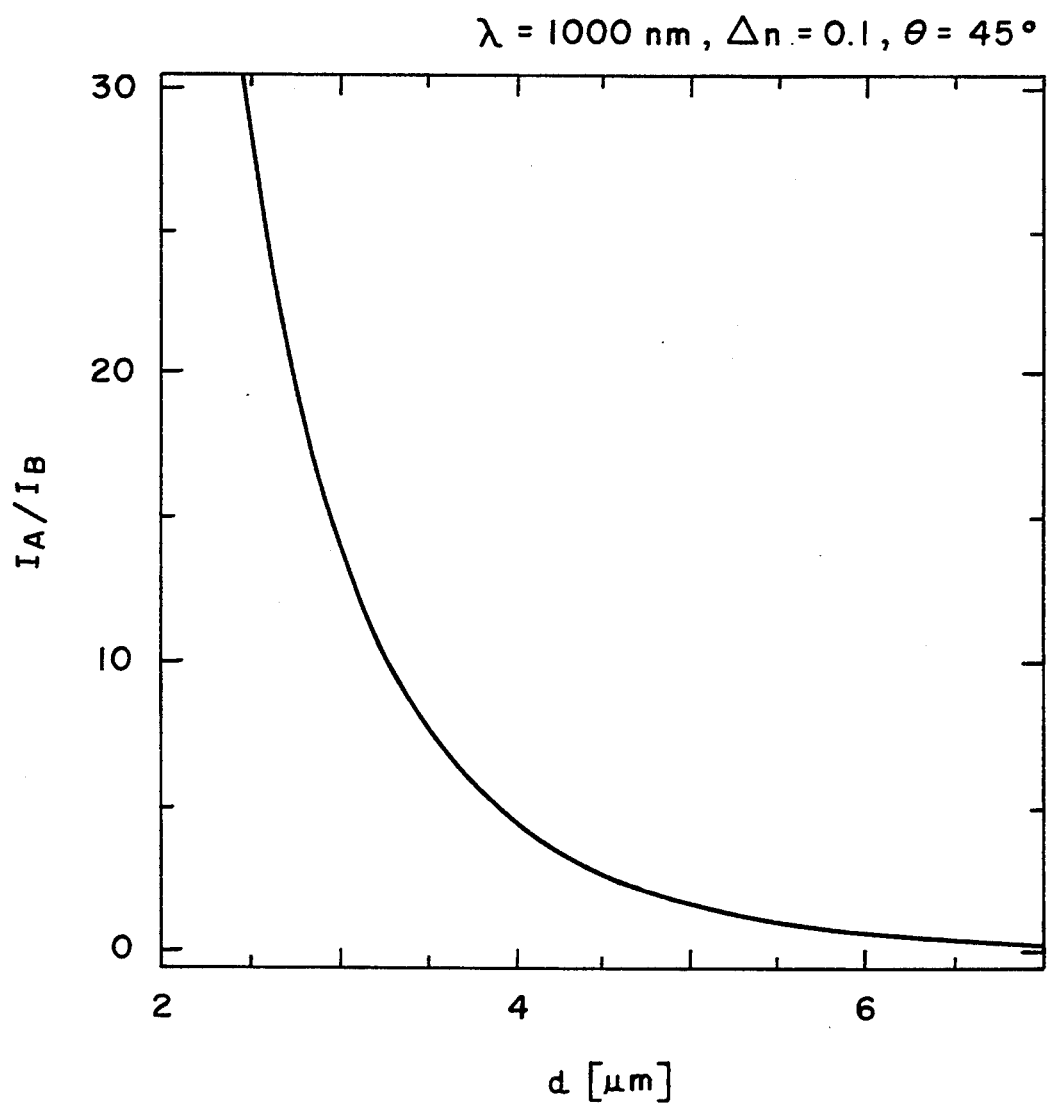
FIG. 15 is a graph showing an example of the result of calculation of the relationship between an intensity ratio and a cell gap of a liquid crystal cell conducted using incident light of a long wavelength with the cell gap measurement instrument shown in FIG. 13.

An example of the result of calculation conducted to find the relationship between the intensity ratio $I_A/I_B$, which is the ratio between the intensity $I_A$ of the first transmission light $L_A$ and the intensity $I_B$ of the second transmission light $L_B$, and the cell gap d of the liquid crystal cell 301 when the polarization angle $\Phi_A - \Phi_B$ of the polarization beam splitter 312 is 90°; the wavelength $\lambda$ of the incident light L is 550 nm; the refractive index anisotropy $\Delta n$ of the liquid crystal cell 301 is 0.1; and the liquid crystal cell 301 is fixed so that the angle $\theta$ of the orientation direction thereof might be 45° as illustrated in FIG. 14. Further, another example of a result of calculation conducted to find the relationship between the intensity ratio $I_A/I_B$ and the cell gap d of the liquid crystal cell 301 when: the wavelength $\lambda$ of the incident light L is 1,000 nm; the refractive index anisotropy $\Delta n$ of the liquid crystal cell 301 is 0.1; and the liquid crystal cell 301 is fixed so that the angle $\theta$ of the orientation direction thereof might be 45° as illustrated in FIG. 5. From the results of calculation illustrated in FIGS. 14 and 15, the cell gap d of the liquid crystal cell 301 can be determined by measuring the intensity ratio $I_A/I_B$ while the liquid crystal cell 301 is fixed. It is to be noted, however, that according to the results of calculation illustrated in FIG. 14, the cell gap d has two values corresponding to the calculated intensity ratio $I_A/I_B$. However, since the relationship between the intensity ratio $I_A/I_B$ and the cell gap d of the liquid crystal cell 301 varies in accordance with the wavelength $\lambda$ of the incident light L, by recalculating the intensity ratio $I_A/I_B$ after varying the wavelength $\lambda$ of the incident light L, the cell gap d of the liquid crystal cell 301 can be specified from the two intensity ratios thus calculated. Meanwhile, when the upper limit of the cell gap d of the liquid crystal cell 301 is known in advance, by measuring the intensity ratio $I_A/I_B$ using the incident light L having a wavelength $\lambda$ of 1,000 nm, the cell gap d of the liquid crystal cell 301 can be calculated by a single measurement operation, as seen from FIG. 15.

Figure 16:
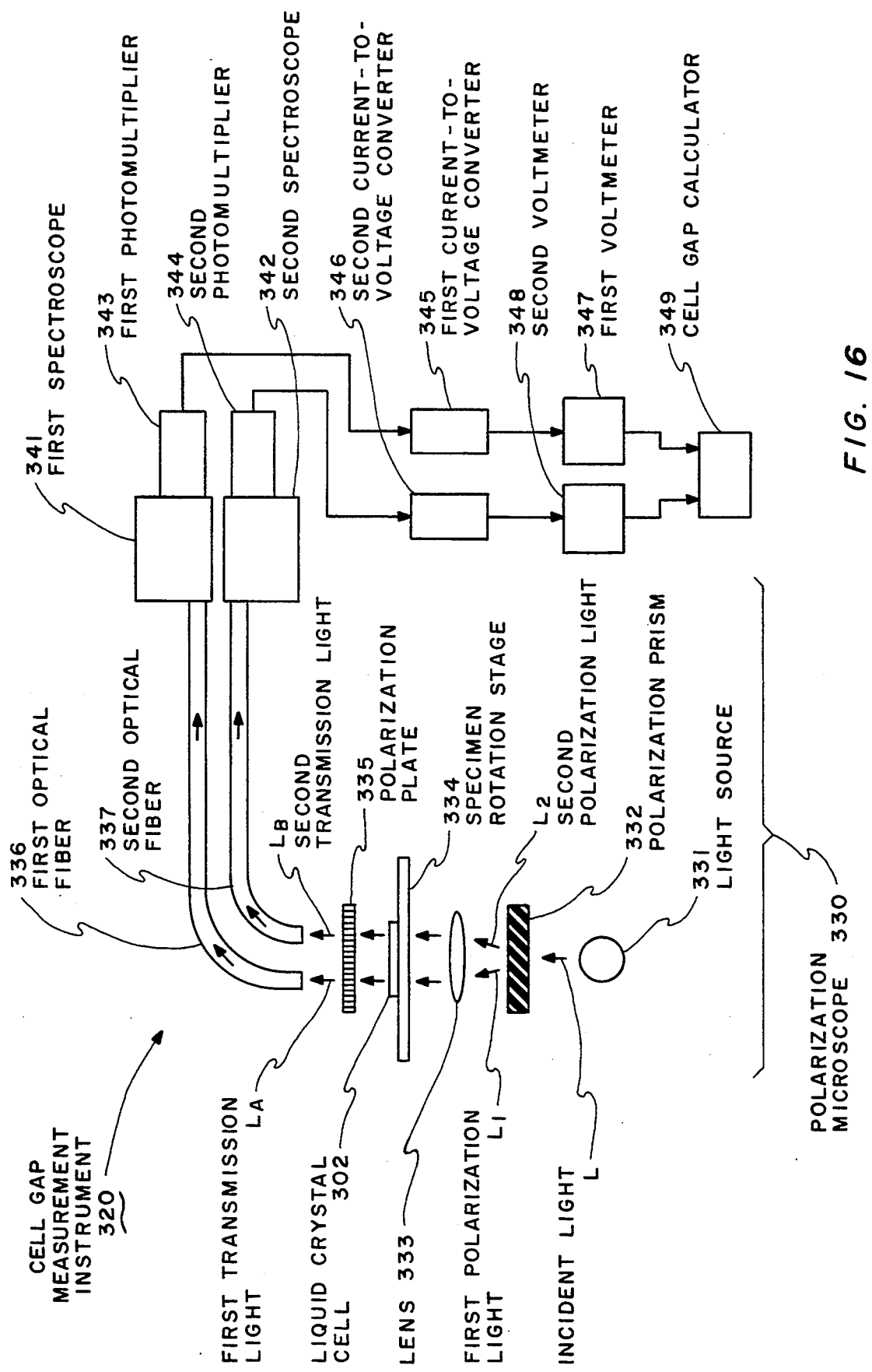
FIG. 16 is a detailed constructive view of a cell gap measurement instrument according to the second embodiment of a cell gap measurement instrument of the present invention.

Next, a concrete example of a cell gap measurement instrument according to the second embodiment of the cell gap measurement instrument of the present invention described above is described with reference to FIG. 16. A cell gap measurement instrument 320 includes a polarization microscope 330, a first spectroscope 341, a second spectroscope 342, a first photomultiplier 343, a second photomultiplier 344, a first current-to-voltage converter 345, a second current-to-voltage converter 346, a first voltmeter 347, a second voltmeter 348, and a cell gap calculator 349. Here, the polarization microscope 330 includes a light source 331 in the form of a halogen lamp for emitting incident light L, a polarization prism 332 in the form of a Wollaston prism for polarizing and separating the incident light L emitted from the light source 331 and introduced into it to obtain first polarized light $L_1$ and second polarized light $L_2$ with a polarization angle of 90°, a lens 333 for converging the first polarized light $L_1$ and the second polarized light beam $L_2$ emitted from the polarization prism 332 and emitting them, a specimen rotation stage 334 into which the first polarized light $L_1$ and the second polarized light $L_2$ that have been transmitted through the lens 333 are introduced, a polarization plate 335 for converting the first polarized light $L_1$ and the second polarized light $L_2$ that have been transmitted through a liquid crystal cell 302 into first transmission light $L_A$ and second transmission light $L_B$, respectively, and emitting the first transmission light $L_A$ and the second transmission light $L_B$, a first optical fiber 336 for introducing the first transmission light $L_A$ emitted from the polarization plate 335 into the first spectroscope 341, and a second optical fiber 337 for introducing the second transmission light $L_B$ emitted from the polarization plate 335 into the second spectroscope 342. It is to be noted that the liquid crystal cell 302 of twisted nematic structure, which is the object for measurement, is placed on the specimen rotation stage 334. The first spectroscope 341 spectrally separates the first transmission light $L_A$ introduced into it by way of the first optical fiber 336 to extract only light of a predetermined wavelength. The second spectroscope 342 spectrally separates the second transmission light $L_B$ introduced into it by way of the second optical fiber 337 to extract only light of the predetermined wavelength. The first photomultiplier 343 converts light extracted by the first spectroscope 341 into a current signal. The second photomultiplier 344 converts light extracted by the second spectroscope 342 into another current signal. The first current-to-voltage converter 345 converts the current signal outputted from the first photomultiplier 343 into a voltage signal. The second current-to-voltage converter 346 converts the current signal outputted from the second photomultiplier 344 into another voltage signal. The first voltmeter 347 reads the voltage value of the voltage signal outputted from the first current-to-voltage converter 345. The second voltmeter 348 reads the voltage value of the voltage signal outputted from the second current-to-voltage converter 346. The cell gap calculator 349 calculates the cell gap of the liquid crystal cell 302 from the voltage value read on the first voltmeter 347 and the voltage value read on the second voltmeter 348.

A method of measuring the cell gap d of the liquid crystal cell 302, which is produced in a similar manner to the liquid crystal cell 202 described hereinabove, using the cell gap measurement instrument 320 is described below. The incident light L emitted from the light source 331 and introduced into the polarization prism 332 is separated into the first polarized light $L_1$ and the second polarized light $L_2$ which are emitted from the polarization prism 332. The first polarized light $L_1$ and the second polarized light $L_2$ emitted from the polarization prism 332 are successively transmitted through the lens 333, the specimen rotation stage 334, and the liquid crystal cell 302 and enter the polarization plate 335, in which they are converted into the first transmission light $L_A$ and the second transmission light $L_B$, respectively. The first transmission light $L_A$ and the second transmission light $L_B$ are emitted from the polarization plate 335. The first transmission light $L_A$ emitted from the polarization plate 335 is introduced into the first spectroscope 341 through the first optical fiber 336. The first transmission light $L_A$ is spectrally separated by the first spectroscope 341 to again obtain monochromatic light. The monochromatic light is introduced into the first photomultiplier 343, in which it is converted into a current signal. The current signal after conversion is inputted to the first current-to-voltage converter 345, in which it is converted into a voltage signal. The voltage signal after conversion is inputted to the first voltmeter 347, on which the voltage value is read. Meanwhile, the second transmission light $L_B$ emitted from the polarization prism 335 is introduced into the second spectroscope 342 through the second optical fiber 337. The second transmission light $L_B$ is spectrally separated by the second spectroscope 342 to obtain monochromatic light. The monochromatic light is introduced into the second photomultiplier 344, in which it is converted into another current signal. The current signal after conversion is inputted to the second current-to-voltage converter 346, in which it is converted into another voltage signal. The voltage signal after conversion is inputted to the second voltmeter 348, on which the voltage value is read.

Next, a method of calculating the cell gap d of the liquid crystal cell 302 from the voltage value read on the first voltmeter 347 and the voltage value read on the second voltmeter 348 by means of the cell gap calculator 349 is described. Before the liquid crystal cell 302 is placed onto the specimen rotation stage 334, both the wavelength of light to be extracted by the first spectroscope 341 and the wavelength of light to be extracted by the second spectroscope 342 are set to 550 nm, and the polarization plate 335 is rotationally adjusted so that the voltage value read on the first voltmeter 347 is at a minimum to thereby adjust one of the two polarization directions of the polarization prism 332 and the polarization direction of the polarization plate 335 such that they are perpendicular to each other. Thereafter, the liquid crystal cell 302 is placed onto the specimen rotation stage 334, and the voltage value is read on the first voltmeter 347 while rotating the specimen rotation stage 334, and the rotation of the specimen rotation stage 334 is stopped at the position at which the voltage value read on the first voltmeter 347 exhibits a maximum value. The ratio between the voltage value read on the first voltmeter 347 and the voltage value read on the second voltmeter 348 is then calculated. Since this calculated ratio corresponds to the intensity ratio $I_A/I_B$ between the intensity $I_A$ of the first transmission light $L_A$ and the intensity $L_B$ of the second transmission light $L_B$, the cell gap d of the liquid crystal cell 302 can be determined for the same reason as described hereinabove.

Figure 17:
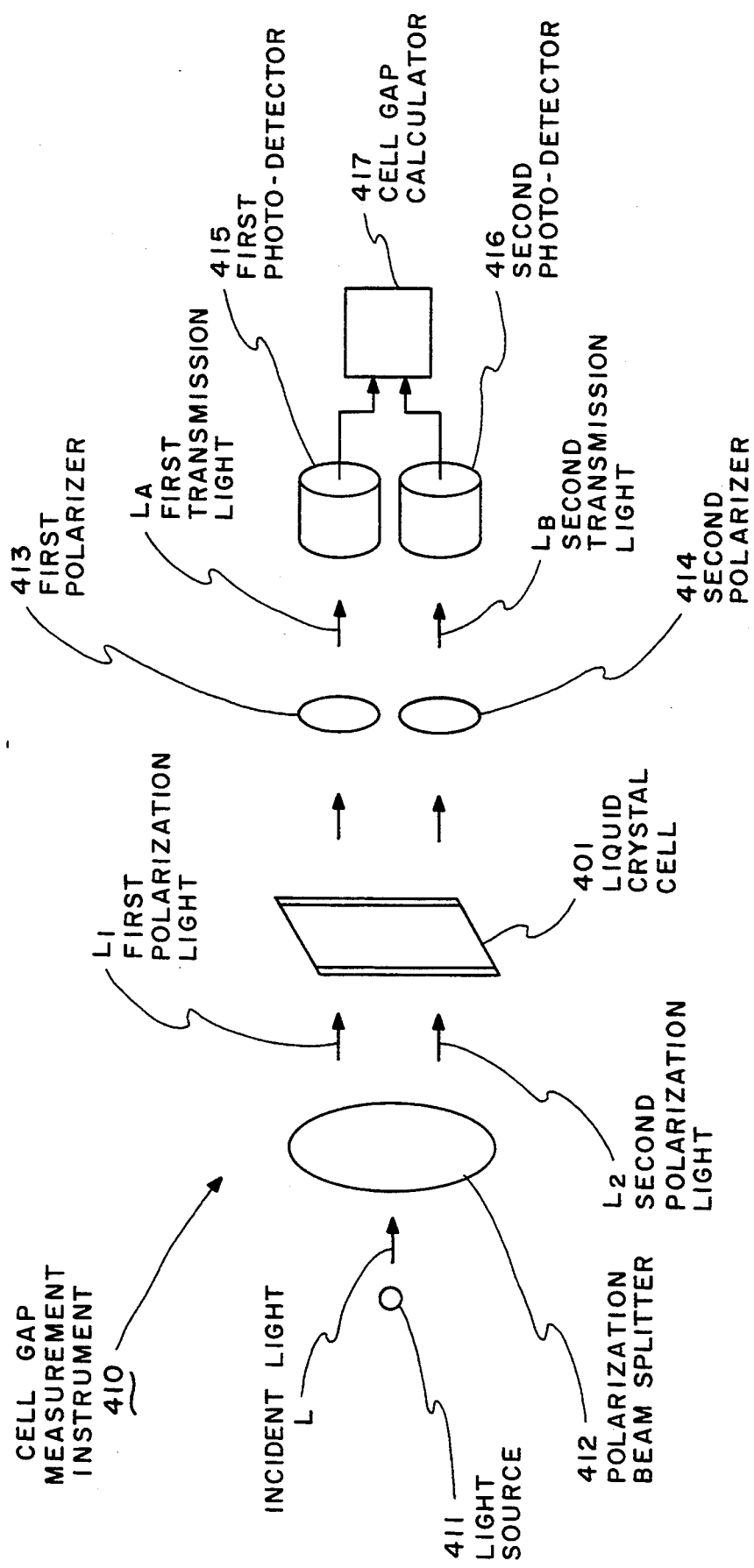
FIG. 17 is a schematic constructive view of a further cell gap measurement instrument showing a third embodiment of a cell gap measurement instrument for a birefringent member of the present invention.

Next, the third embodiment of a cell gap measurement instrument of the present invention is described with reference to FIG. 17. A cell gap measurement instrument 400 includes a light source 411 for emitting incident light L, a polarization beam splitter 412 into which the incident light L emitted from the light source 411 is introduced, first and second polarizers 413 and 414 located so that the transmission planes thereof may be included in a common plane, a first photo-detector 415, a second photo-detector 416, and a cell gap calculator 417. It is to be noted that a liquid crystal cell 401 of twisted nematic structure, which is the object for measurement, is interposed between the polarization beam splitter 412 and the first and second polarizers 413 and 414. Here, the polarization beam splitter 412 has two different angles of polarization direction (an angle $\Phi_A$ of the first polarization direction and an angle $\Phi_B$ of the second polarization direction), and separates the incident light L introduced into it from the light source 411 into first polarized light $L_1$ and second polarized light $L_2$ with a polarization angle of $\Phi_A - \Phi_B$ and emits the first polarized light $L_1$ and the second polarized light $L_2$. The first polarizer 413 has a polarization direction of an angle $\Phi_A'$ and converts the first polarized light $L_1$, which has been transmitted through the liquid crystal cell 401, into the first transmission light $L_A$ and emits this light. The second polarizer 414 has the polarization direction of an angle $\Phi_B'$ and converts the second polarized light $L_2$, which has been transmitted through the liquid crystal cell 401, into the second transmission light $L_B$ and emits this light. The first photo-detector 415 detects the intensity of the first transmission light $L_A$ emitted from the first polarizer 413. The second photo-detector 416 detects the intensity of the second transmission light $L_B$ emitted from the second polarizer 414. The cell gap calculator 417 calculates the cell gap of the liquid crystal cell 401 from the ratio between the intensity of the first transmission light $L_A$ detected by the first photo-detector 415 and the intensity of the second transmission light $L_B$ detected by the/second photo-detector 416.

If: the electric field component of the incident light L in the X-axis direction, which is perpendicular to the incidence direction of the incident light L, is represented by $E_X$, the electric field component of the incident light L in the Y-axis direction is represented by $E_Y$, the electric field component of the first transmission light $L_A$ in the X-axis direction is represented by $E_{XA}$, the electric field component of the first transmission light $L_A$ in the Y-axis direction is represented by $E_{YA}$, the electric field component of the second transmission light $L_B$ in the X-axis direction is represented by $E_{XB}$, the electric field component the second transmission light $L_B$ in the Y-axis direction is represented by $E_{YB}$, the refractive index anisotropy of the liquid crystal cell 401 is represented by $\Delta n$, the twist angle of the liquid crystal cell 401 is represented by $\theta_{TW}$ (in the case of the liquid crystal cell 401 of twisted nematic structure, the twist angle $\theta_{TW}=90°$), the cell gap of the liquid crystal cell 401 is represented by d, the wavelength of the incident light L is represented by $\lambda$, and the angle of the orientation direction of the liquid crystal cell 401 is represented by $\theta$; then the electric field component $E_{XA}$ of the first transmission light $L_A$ in the X-axis direction and the electric field component $E_{YA}$ of the first transmission light $L_A$ in the Y-axis direction as well as the electric field component $E_{XB}$ of the second transmission light $L_B$ in the X-axis direction and the electric field component $E_{YB}$ of the second transmission light $L_B$ in the Y-axis direction are represented by equations (32) and (33), respectively, by calculation using the Jones matrix representation:

$$\begin{bmatrix} E_{XA} \\ E_{YA} \end{bmatrix} = R_{(\Phi_{A'})}^{-1} \cdot \begin{bmatrix} 1 & 0 \\ 0 & 0 \end{bmatrix} \cdot R_{(\Phi_{A'})} \cdot R_{(\theta)}^{-1} \cdot \begin{bmatrix} a & b \\ -b^* & a^* \end{bmatrix} \cdot$$

$$R_{(\theta)} \cdot R_{(\Phi_A)}^{-1} \cdot \begin{bmatrix} 1 & 0 \\ 0 & 0 \end{bmatrix} \cdot R_{(\Phi_A)} \cdot \begin{bmatrix} E_X \\ E_Y \end{bmatrix}$$

$$\begin{bmatrix} E_{XB} \\ E_{YB} \end{bmatrix} = R_{(\Phi_{B'})}^{-1} \cdot \begin{bmatrix} 1 & 0 \\ 0 & 0 \end{bmatrix} \cdot R_{(\Phi_{B'})} \cdot R_{(\theta)}^{-1} \cdot \begin{bmatrix} a & b \\ -b^* & a^* \end{bmatrix} \cdot$$

$$R_{(\theta)} \cdot R_{(\Phi_B)}^{-1} \cdot \begin{bmatrix} 1 & 0 \\ 0 & 0 \end{bmatrix} \cdot R_{(\Phi_B)} \cdot \begin{bmatrix} E_X \\ E_Y \end{bmatrix}$$

Meanwhile, the intensity $I_A$ of the first transmission light $L_A$ detected by the first photo-detector 415 and the intensity $I_B$ of the second transmission light $L_B$ detected by the second photo-detector 416 are represented by equations (34) and (35), respectively:

$$I_A = |E_{XA}|^2 + |E_{YA}|^2 \quad (34)$$

$$I_B = |E_{XB}|^2 + |E_{YB}|^2 \quad (35)$$

Here, the variables a and b and the function R in equations (32) and (33) are the same as those described hereinabove.

Figure 18:
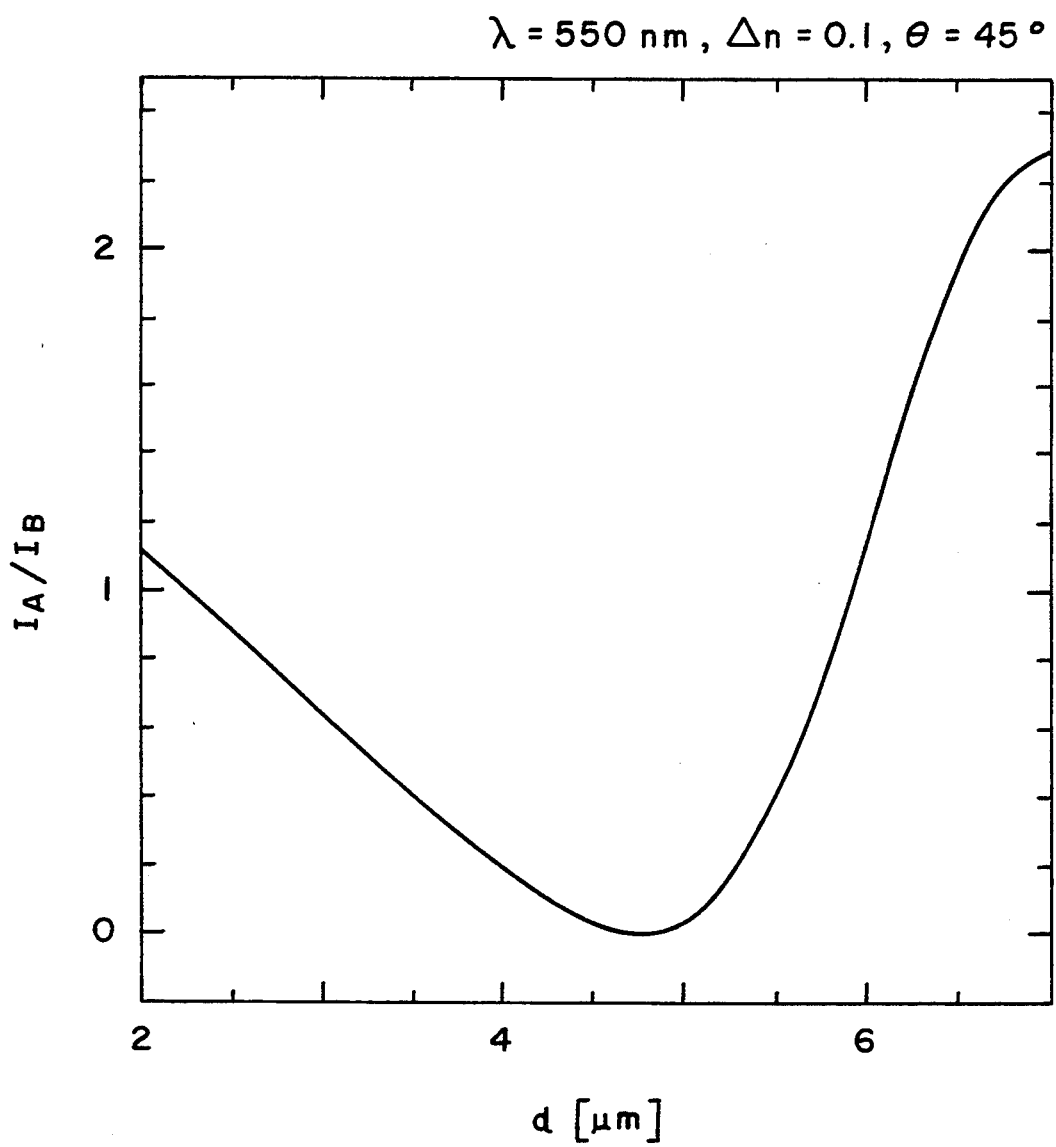
FIG. 18 is a graph showing an example of the result of calculation of the relationship between an intensity ratio and a cell gap of a liquid crystal cell conducted using incident light of a short wavelength with the cell gap measurement instrument shown in FIG. 17.
Figure 19:
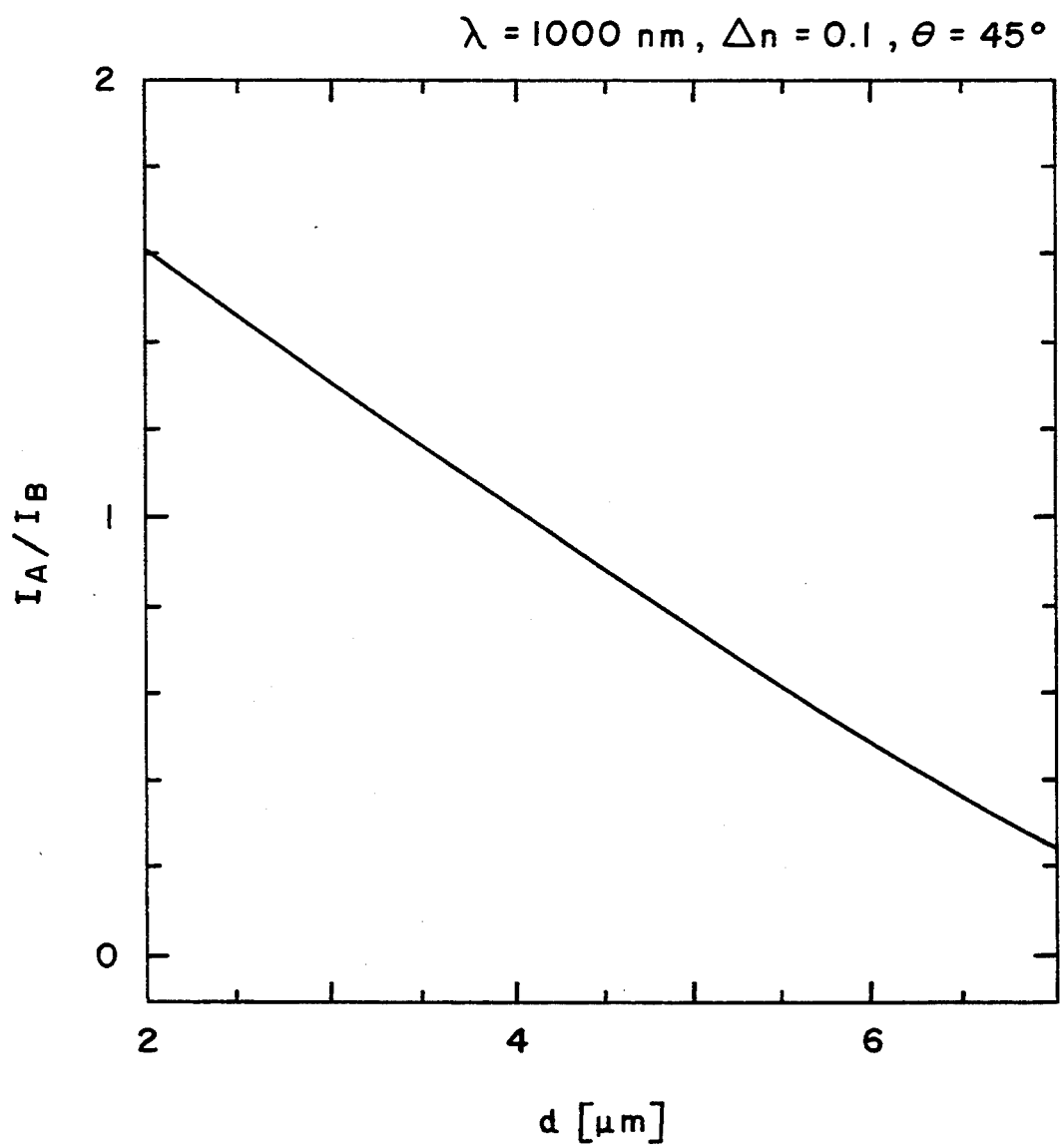
FIG. 19 is a graph showing an example of the result of calculation of the relationship between an intensity ratio and a cell gap of a liquid crystal cell conducted using incident light of a long wavelength with the cell gap measurement instrument shown in FIG. 17.

FIG. 18 illustrates an example of the result of calculation conducted to find the relationship between the intensity ratio $I_A/I_B$, which is the ratio between the intensity $I_A$ of the first transmission light $L_A$ and the intensity $I_B$ of the second transmission light $L_B$, and the cell gap d of the liquid crystal cell 401 when: the polarization angle $\Phi_A - \Phi_B$ of the polarization beam splitter 412 is 90° the difference $\Phi_A - \Phi_A'$ between the angle $\Phi_A$ of the first polarization direction of the polarization beam splitter 412 and the angle $\Phi_A'$ of the polarization direction of the first polarizer 413 is 90°; the difference $\Phi_B - \Phi_B'$ between the angle $\Phi_B$ of the first polarization direction of the polarization beam splitter 412 and the angle $\Phi_B'$ of the polarization direction of the second polarizer 414 is 90°; the second polarizer 414 is rotated by 45°; the wavelength $\lambda$ of the incident light L is 550 nm; the refractive index anisotropy $\Delta n$ of the liquid crystal cell 401 is 0.1; and the liquid crystal cell 401 is fixed so that the angle $\theta$ of the orientation direction thereof might be 45°. Further, another example of the result of calculation conducted to find the relationship between the intensity ratio $I_A/I_B$ and the cell gap d of the liquid crystal cell 401 when: the wavelength $\lambda$ of the incident light L is 1,000 nm; the refractive index anisotropy $\Delta n$ of the liquid crystal cell 401 is 0.1; and the liquid crystal cell 401 is fixed so that the angle $\theta$ of the orientation direction thereof might be 45° is illustrated in FIG. 19. From the results of calculation illustrated in FIGS. 18 and 19, the cell gap d of the liquid crystal cell 401 can be determined by measuring the intensity ratio $I_A/I_B$ while the liquid crystal cell 401 is fixed. However, it is to be noted that, according to the result of calculation illustrated in FIG. 18, the cell gap d sometimes has two values corresponding to the calculated intensity ratio $I_A/I_B$. However, since the relationship between the intensity ratio $I_A/I_B$ and the cell gap d of the liquid crystal cell 401 varies in accordance with the wavelength $\lambda$ of the incident light L, by recalculating the intensity ratio $I_A/I_B$ after varying the wavelength $\lambda$ of the incident light L, the cell gap d of the liquid crystal cell 401 can be specified from the two intensity ratios thus calculated. Meanwhile, when the upper limit of the cell gap d of the liquid crystal cell 401 is known in advance, by measuring the intensity ratio $I_A/I_B$ using the incident light L having a wavelength $\lambda$ of 1,000 nm, the cell gap d of the liquid crystal cell 401 can be calculated by a single measurement operation, as seen from FIG. 19.

Figure 20:
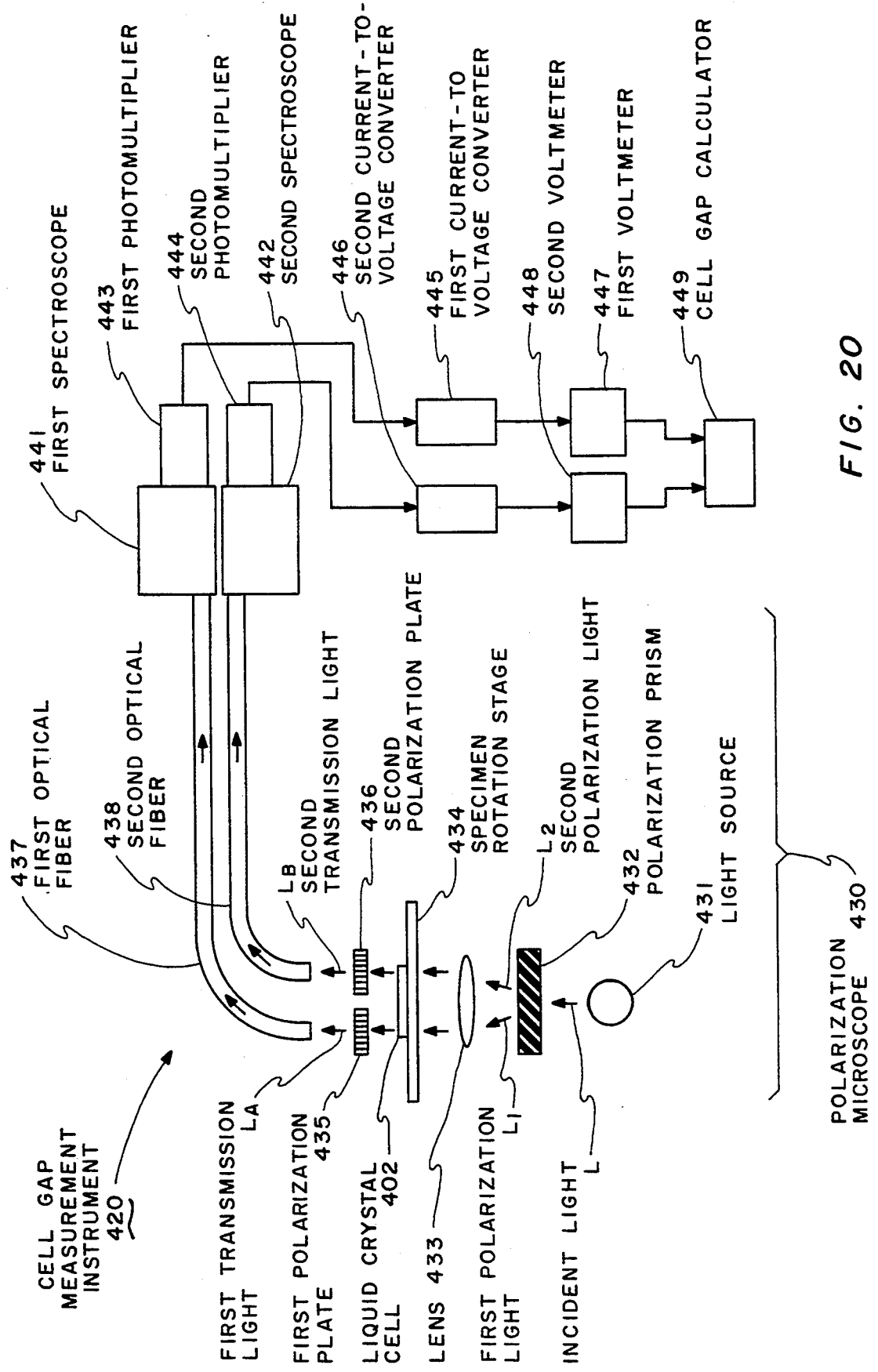
FIG. 20 is a detailed constructive view of a cell gap measurement instrument according to the third embodiment of a cell gap measurement instrument of the present invention.

Next, a concrete example of a cell gap measurement instrument according to the third embodiment of the cell gap measurement instrument of the present invention described above is described with reference to FIG. 20. A cell gap measurement instrument 420 includes a polarization microscope 430, a first spectroscope 441, a second spectroscope 442, a first photomultiplier 443, a second photomultiplier 444, a first current-to-voltage converter 445, a second current-to-voltage converter 446, a first voltmeter 447, a second voltmeter 448, and a cell gap calculator 449. Here, the polarization microscope 430 includes a light source 431 in the form of a halogen lamp for emitting incident light L, a polarization prism 432 in the form of a Wollaston prism for separating the incident light L introduced into it from the light source 431 to obtain first polarized light $L_1$ and second polarized light $L_2$ with a polarization angle of 90°, a lens 433 for converging the first polarized light $L_1$ and the second polarized light $L_2$ emitted from the polarization prism 432 and emitting them, a specimen rotation stage 434 into which the first polarized light $L_1$ and the second polarized light $L_2$ that have been transmitted through the lens 433 are introduced, a first polarization plate 435 for converting the first polarized light $L_1$ that has been transmitted through a liquid crystal cell 402 into first transmission light $L_A$ and emitting this light, a second polarization plate 436 for converting the second polarized light $L_2$ that has been transmitted through the liquid crystal cell 402 into second transmission light $L_B$ and emitting this light, a first optical fiber 437 for introducing the first transmission light $L_A$ emitted from the first polarization plate 435 into the first spectroscope 441, and a second optical fiber 438 for introducing the second transmission light $L_B$ emitted from the second polarization plate 436 into the second spectroscope 442. It is to be noted that the liquid crystal cell 402 of twisted nematic structure, which is the object for measurement, is placed on the specimen rotation stage 434. The first spectroscope 441 spectrally separates the first transmission light $L_A$ introduced into it by way of the first optical fiber 437 to extract only light of a predetermined wavelength. The second spectroscope 442 spectrally separates the second transmission light $L_B$ introduced into it by way of the second optical fiber 438 to extract only light of the predetermined wavelength. The first photomultiplier 443 converts light extracted by the first spectroscope 441 into a current signal. The second photomultiplier 444 converts light extracted by the second spectroscope 442 into another current signal. The first current-to-voltage converter 445 converts the current signal outputted from the first photomultiplier 443 into a voltage signal. The second current-to-voltage converter 446 converts the current signal outputted from the second photomultiplier 444 into another voltage signal. The first voltmeter 447 reads the voltage value of the voltage signal outputted from the first current-to-voltage converter 445. The second voltmeter 448 reads the voltage value of the voltage signal outputted from the second current-to-voltage converter 446. The cell gap calculator 449 calculates the cell gap of the liquid crystal cell 402 from the voltage value read on the first voltmeter 447 and the voltage value read on the second voltmeter 448.

A method of measuring the cell gap d of the liquid crystal cell 402, which is produced in a manner similar to the liquid crystal cell 202 described hereinabove, using the cell gap measurement instrument 420 is described below. The incident light L emitted from the light source 431 and introduced into the polarization prism 432 is separated into the first polarized light $L_1$ and the second polarized light $L_2$, which are emitted from the polarization prism 432. The first polarized light $L_1$ emitted from the polarization prism 432 is successively transmitted through the lens 433, the specimen rotation stage 434, and the liquid crystal cell 402 and enters the first polarization plate 435, in which it is converted into the first transmission light $L_A$. The first transmission light $L_A$ emitted from the polarization plate 435 is introduced into the first spectroscope 441 through the first optical fiber 437. The first transmission light $L_A$ is spectrally separated by the first spectroscope 441 to obtain monochromatic light. The monochromatic light is introduced into the first photomultiplier 443, in which it is converted into a current signal. The current signal after conversion is inputted to the first current-to-voltage converter 445, in which it is converted into a voltage signal. The voltage signal after conversion is inputted to the first voltmeter 447, on which the voltage value is read. Meanwhile, the second polarized light $L_2$ emitted from the polarization prism 432 is successively transmitted through the lens 433, the specimen rotation stage 434, and the liquid crystal cell 402 and enters the second polarization plate 436, in which it is converted into the second transmission light $L_B$. The second transmission light $L_B$ emitted from the second polarization plate 436 is introduced into the second spectroscope 442 through the second optical fiber 438. The second transmission light $L_B$ is spectrally separated by the second spectroscope 442 to again obtain monochromatic light. The monochromatic light is introduced into the second photomultiplier 444, in which it is converted into another current signal. The current signal after conversion is inputted to the second current-to-voltage converter 446, in which it is converted into another voltage signal. The voltage signal after conversion is inputted to the second voltmeter 448, on which the voltage value is read.

Next, a method of calculating the cell gap d of the liquid crystal cell 402 from the voltage value read on the first voltmeter 447 and the voltage value read on the second voltmeter 448 by means of the cell gap calculator 449 is described. Before the liquid crystal cell 402 is placed onto the specimen rotation stage 434, both the wavelength of light to be extracted by the first spectroscope 441 and the wavelength of light to be extracted by the second spectroscope 442 are set to 550 nm, and the polarization plate 435 is rotationally adjusted so that the voltage value read on the first voltmeter 447 is at a minimum to thereby adjust one of the two polarization directions of the polarization prism 432 and the polarization direction of the first polarization plate 435 so as to be perpendicular relative to each other. Thereafter, the liquid crystal cell 402 is placed onto the specimen rotation stage 434, and the voltage value is read on the first voltmeter 447 while rotating the specimen rotation stage 434, and rotation of the specimen rotation stage 434 is stopped at the position at which the voltage value read on the first voltmeter 447 exhibits a maximum value. The ratio between the voltage value read on the fist voltmeter 447 and the voltage value read on the second voltmeter 448 is then calculated. Since the ratio calculated then corresponds to the intensity ratio $I_A/I_B$ between the intensity $I_A$ of the first transmission light $L_A$ and the intensity $I_B$ of the second transmission light $L_B$, the cell gap d of the liquid crystal cell 402 can be determined for the same reason described hereinabove.

Birefringent members, which are an object of the cell gap measurement according to the embodiments of a cell gap measurement method for a birefringent member of the present invention and a cell gap measurement instrument for a birefringent member of the present invention, may include liquid crystal cells of twisted nematic structure and supertwisted nematic liquid crystal cells which are birefringent members having a layered structure of uniaxial optical anisotropic substances, uniaxial drawn films which are birefringent members made of a simple uniaxial optical anisotropic substance, adhered members formed from two or more uniaxial films, and optical anisotropic crystal. Meanwhile, in order to measure the cell gap at a plurality of locations on a birefringent member, a mechanism for moving a birefringent member two-dimensionally should additionally be provided. For example, the specimen rotation stage 33 shown in FIG. 4 may be additionally provided with a function for moving the liquid crystal cell 2 two-dimensionally.

While the present invention has been described in conjunction with preferred embodiments thereof, it will now be possible for one skilled in the art to easily put the present invention into practice in various other manners.

What is claimed is:

1. A cell gap measurement method for a birefringent member wherein incident light is emitted and passes through first and second polarization transmission means located in an opposing relationship to each other on the optic axis of the incident light with the polarization directions of the first and second polarization transmission means displaced from each other by a predetermined angle and wherein the birefringent member is arranged for rotation around the optic axis of the incident light between the first polarization transmission means and the second polarization transmission means; comprising the steps of:

introducing the incident light into the first polarization transmission means while rotating the birefringent member;

calculating a ratio between a variable component and a fixed component of an intensity of transmission light which is the incident light that has been transmitted successively through the first polarization transmission means, the birefringent member, and the second polarization transmission means; and determining the cell gap of the birefringent member from the calculated ratio between the variable component and the fixed component of the intensity of the transmission light.

2. The cell gap measurement method for a birefringent member as claimed in claim 1, comprising the steps of:

separately emitting first incident light having a predetermined wavelength and second incident light having a wavelength different from the predetermined wavelength;

calculating a first ratio between a variable component and a fixed component of an intensity of a first transmission light which is the first incident light that has been transmitted successively through the first polarization transmission means, the birefringent member, and the second polarization transmission means;

calculating a second ratio between a variable component and a fixed component of an intensity of a second transmission light which is the second incident light that has been transmitted successively through the first polarization transmission means, the birefringent member, and the second polarization transmission means; and determining the cell gap of the birefringent member from the calculated first ratio between the variable component and the fixed component of the intensity of the first transmission light and the calculated second ratio between the variable component and the fixed component of the intensity of the second transmission light.

3. A cell gap measurement method for a birefringent member wherein incident light is emitted and passes through first and second polarization transmission means located in an opposing relationship to each other on the optic axis of the incident light with the polarization directions of the first and second polarization transmission means displaced from each other by a predetermined angle and wherein the birefringent member is arranged for rotation around the optic axis of the incident light between the first polarization transmission means and the second polarization transmission means; comprising the steps of:

introducing the incident light into the first polarization transmission means while rotating the birefringent member;

calculating maximum and minimum values of an intensity of transmission light which is the incident light that has been transmitted successively through the first polarization transmission means, the birefringent member, and the second polarization transmission means; and determining the cell gap of the birefringent member from the calculated maximum and minimum values of the intensity of the transmission light.

4. The cell gap measurement method for a birefringent member as claimed in claim 3, comprising the steps of:

separately emitting first incident light having a predetermined wavelength and second incident light having a wavelength different from the predetermined wavelength;

calculating first maximum and minimum values of an intensity of first transmission light which is the first incident light that has been transmitted successively through the first polarization transmission means, the birefringent member, and the second polarization transmission means;

calculating second maximum and minimum values of an intensity of second transmission light which is the second incident light that has been transmitted successively through the first polarization transmission means, the birefringent member, and the second polarization transmission means; and determining the cell gap of the birefringent member from the calculated first maximum and minimum values of the intensity of the first transmission light and the calculated second maximum and minimum values of the intensity of the second transmission light.

5. A cell gap measurement method for a birefringent member wherein incident light is emitted and passes through first and second polarization transmission means located in an opposing relationship to each other on the optic axis of the incident light with the polarization directions of the first and second polarization transmission means displaced from each other by an angle of 90° and wherein the birefringent member is arranged for rotation around the optic axis of the incident light between the first polarization transmission means and the second polarization transmission means; comprising the steps of:

introducing the incident light into the first polarization transmission means while rotating the birefringent member;

calculating maximum and minimum values of an intensity of transmission light which is the incident light that has been transmitted successively through the first polarization transmission means, the birefringent member, and the second polarization transmission means; and determining the cell gap of the birefringent member from the sum of the calculated maximum and minimum values of the intensity of the transmission light and the difference between the calculated maximum and minimum values of the intensity of the transmission light.

6. The cell gap measurement method for a birefringent member as claimed in claim 5, comprising the steps of:

separately emitting first incident light having a predetermined wavelength and second incident light having a wavelength different from the predetermined wavelength;

calculating the sum of first maximum and minimum values of an intensity of first transmission light which is the first incident light that has been transmitted successively through the first polarization transmission means, the birefringent member, and the second polarization transmission means and the difference between the first maximum and minimum values;

calculating the sum of second maximum and minimum values of an intensity of second transmission light which is the second incident light that has been transmitted successively through the first polarization transmission means, the birefringent member, and the second polarization transmission means and the difference between the second maximum and minimum values; and determining the cell gap of the birefringent member from the calculated sum and difference between the first maximum and minimum values of the intensity of the first transmission light and the calculated sum and difference between the second maximum and minimum values of the intensity of the second transmission light.

7. A cell gap measurement method for a birefringent member wherein incident light is emitted and passes through first and second polarization transmission means located in an opposing relationship to each other on the optical axis of the incident light, the second polarization transmission means being arranged for rotation around the optical axis of incident light and wherein the birefringent member is arranged between the first polarization transmission means and the second polarization transmission means; comprising the steps of:

introducing the incident light into the first polarization transmission means while rotating the second polarization transmission means;

calculating maximum and minimum values of a transmission factor of transmission light which is the incident light that has been transmitted successively through the first polarization transmission means, the birefringent member, and the second polarization transmission means; and determining the cell gap of the birefringent member from the calculated maximum and minimum values of the transmission factor of the transmission light.

8. A cell gap measurement method for a birefringent member wherein incident light is emitted and passes through first and second polarization transmission means arranged in an opposing relationship to each other on the optical axis of the incident light, first polarization transmission means being arranged for rotation around the optical axis of the incident light, and wherein the birefringent member is arranged between the first polarization transmission means and the second polarization transmission means; comprising the steps of:

introducing the incident light into the first polarization transmission means while rotating the first polarization transmission means;

calculating maximum and minimum values of a transmission factor of transmission light which is the incident light that has been transmitted successively through the first polarization transmission means, the birefringent member, and the second polarization transmission means; and determining the cell gap of the birefringent member from the calculated maximum and minimum values of the transmission factor of the transmission light.

9. A cell gap measurement instrument for a birefringent member, comprising:

light source for emitting incident light;

polarization transmission means into which the incident light emitted from the light source is introduced;

polarization separation means for separating the incident light that has passed through the polarization transmission means into first transmission light and second transmission light with a predetermined polarization angle;

first photo-detection means for detecting the intensity of the first transmission light emitted from the polarization separation means;

second photo-detection means for detecting the intensity of the second transmission light emitted from the polarization separation means; and cell gap calculation means for calculating the cell gap of the birefringent member from the intensity ratio which is the ratio between the intensity of the first transmission light detected by the first photo-detection means and the intensity of the second transmission light detected by the second photo-detection means.

10. The cell gap measurement instrument for a birefringent member as claimed in claim 9, wherein;

the light source separately emits first incident light having a predetermined wavelength and second incident light having a wavelength different from the predetermined wavelength; and the cell gap calculation means calculates a first intensity ratio for the first incident light, calculates a second intensity ratio for the second incident light, and then calculates the cell gap of the birefringent member from the calculated first intensity ratio and the calculated second intensity ratio.

11. A cell gap measurement instrument for a birefringent member, comprising:

light source for emitting incident light;

polarization separation means for separating the incident light emitted from the light source into first polarized light and second polarized light with a predetermined polarization angle;

polarization transmission means for converting the first polarized light and the second polarized light that have been emitted from the polarization separation means and transmitted through the birefringent member into first transmission light and second transmission light, respectively;

first photo-detection means for detecting the intensity of the first transmission light emitted from the polarization transmission means;

second photo-detection means for detecting the intensity of the second transmission light emitted from the polarization transmission means; and cell gap calculation means for calculating the cell gap of the birefringent member from the intensity ratio which is the ratio between the intensity of the first transmission light detected by the first photo-detection means and the intensity of the second transmission light detected by the second photo-detection means.

12. The cell gap measurement instrument for a birefringent member as claimed in claim 11, wherein:

the light source separately emits first incident light having a predetermined wavelength and second incident light having a wavelength different from the predetermined wavelength; and the cell gap calculation means calculates a first intensity ratio for the first incident light, calculates a second intensity ratio for the second incident light, and then calculates the cell gap of the birefringent member from the calculated first intensity ratio and the calculated second intensity ratio.

13. A cell gap measurement instrument for a birefringent member, comprising:

light source for emitting incident light;

polarization separation means for separating the incident light emitted from the light source into first polarized light and second polarized light with a predetermined polarization angle;

first polarization transmission means for converting the first polarized light that has been emitted from the polarization separation means and transmitted through the birefringent member into first transmission light;

second polarization transmission means for converting the second polarized light that has been emitted from the polarization separation means and transmitted through the birefringent member into second transmission light;

first photo-detection means for detecting the intensity of the first transmission light emitted from the first polarization transmission means;

second photo-detection means for detecting the intensity of the second transmission light emitted from the second polarization transmission means; and cell gap calculation means for calculating the cell gap of the birefringent member from the intensity ratio which is the ratio between the intensity of the first transmission light detected by the first photo-detection means and the intensity of the second transmission light detected by the second photo-detection means.

14. The cell gap measurement instrument for a birefringent member as claimed in claim 13, wherein:

the light source separately emits first incident light having a predetermined wavelength and second incident light having a wavelength different from the predetermined wavelength; and the cell gap calculation means calculates the first intensity ratio for the first incident light, calculates the second intensity ratio for the second incident light, and then calculates the cell gap of the birefringent member from the calculated first intensity ratio and the calculated second intensity ratio.

* * * * *